United States Patent
Lin et al.

(10) Patent No.: US 11,353,777 B2
(45) Date of Patent: Jun. 7, 2022

(54) PLASTIC LENS BARREL, IMAGING LENS MODULE AND ELECTRONIC DEVICE

(71) Applicant: LARGAN PRECISION CO., LTD., Taichung (TW)

(72) Inventors: Cheng-Feng Lin, Taichung (TW); Lin-An Chang, Taichung (TW); Hsiang-Chi Tang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 136 days.

(21) Appl. No.: 16/877,544

(22) Filed: May 19, 2020

(65) Prior Publication Data

US 2021/0048733 A1 Feb. 18, 2021

(30) Foreign Application Priority Data

Aug. 13, 2019 (TW) .................................. 108128794

(51) Int. Cl.
  *G02B 7/02* (2021.01)
  *G03B 17/12* (2021.01)

(52) U.S. Cl.
  CPC ............. *G03B 17/12* (2013.01); *G02B 7/021* (2013.01); *G02B 7/026* (2013.01)

(58) Field of Classification Search
  CPC .......... G02B 7/02; G02B 7/021; G02B 7/022; G02B 7/023; G02B 7/025; G02B 7/026; G02B 13/0045; G02B 13/0015; G02B 13/002; G02B 13/004; G02B 13/001; G02B 27/0018; G02B 5/005; G02B 7/00; G03B 17/12

See application file for complete search history.

(56) References Cited

U.S. PATENT DOCUMENTS

| | | | |
|---|---|---|---|
| 8,455,810 B2 | 6/2013 | Tomioka et al. |
| 9,864,160 B2 | 1/2018 | Lin et al. |
| 9,946,047 B2 | 4/2018 | Lin et al. |
| 10,114,192 B2 | 10/2018 | Wei et al. |
| 10,151,900 B2 | 12/2018 | Lin et al. |

(Continued)

FOREIGN PATENT DOCUMENTS

| | | | |
|---|---|---|---|
| CN | 205103485 U | 3/2016 |
| CN | 205507179 U | 8/2016 |

(Continued)

*Primary Examiner* — Ephrem Z Mebrahtu
(74) *Attorney, Agent, or Firm* — McClure, Qualey & Rodack, LLP

(57) ABSTRACT

A plastic barrel, which surrounds a central axis, includes an object-side portion and a tubular portion. The object-side portion includes an object-side opening and a reverse inclined structure. The reverse inclined structure surrounds the object-side opening and includes a reverse inclined surface and at least one annular concave structure. The at least one annular concave structure is disposed on an object side of the reverse inclined surface and recessed from the object-side opening along a direction away from the central axis, wherein a sectional surface of the at least one annular concave structure passing through the central axis includes a valley point and two concave ends, and the two concave ends are disposed on an object side and an image side of the valley point, respectively. The tubular portion is connected to the object-side portion and extends to the image side.

25 Claims, 32 Drawing Sheets

(56) References Cited

U.S. PATENT DOCUMENTS

| | | |
|---|---|---|
| 10,197,761 B2 | 2/2019 | Lin et al. |
| 10,281,676 B2 | 5/2019 | Lin et al. |
| 2014/0133040 A1* | 5/2014 | Tsai .................. G02B 7/02 359/819 |
| 2015/0146093 A1 | 5/2015 | Lin |
| 2015/0277077 A1 | 10/2015 | McIntyre et al. |
| 2017/0010434 A1* | 1/2017 | Chou ................ G02B 7/021 |
| 2017/0139172 A1 | 5/2017 | Wei et al. |
| 2017/0139174 A1 | 5/2017 | Wei et al. |
| 2017/0139175 A1 | 5/2017 | Wei et al. |
| 2017/0139176 A1 | 5/2017 | Wei et al. |
| 2018/0003916 A1* | 1/2018 | Lin ................... G02B 7/021 |
| 2019/0018171 A1 | 1/2019 | Chang et al. |
| 2020/0209441 A1* | 7/2020 | Chen ................. G02B 7/021 |
| 2020/0314300 A1* | 10/2020 | Feng ................. G02B 7/021 |
| 2020/0333562 A1* | 10/2020 | Lin ................... G02B 13/18 |

FOREIGN PATENT DOCUMENTS

| | | | |
|---|---|---|---|
| CN | 206339822 U | 7/2017 | |
| WO | WO-2016009734 A1 * | 1/2016 | ............ G02B 1/118 |

\* cited by examiner

PLASTIC LENS BARREL, IMAGING LENS MODULE AND ELECTRONIC DEVICE

RELATED APPLICATIONS

This application claims priority to Taiwan Application Serial Number 108128794, filed Aug. 13, 2019, which is herein incorporated by reference.

BACKGROUND

Technical Field

The present disclosure relates to a plastic lens barrel and an imaging lens module. More particularly, the present disclosure relates to a plastic lens barrel and an imaging lens module applied to portable electronic devices.

Description of Related Art

Recently, portable electronic devices, such as intelligent electronic devices, tablets, etc., are developed rapidly and have been filled with the lives of modern people. Accordingly, the imaging lens module disposed on the portable electronic device is also flourished. However, as technology is more and more advanced, demands for the quality of the imaging lens module of users have become higher and higher. Therefore, not only the quality of the optical design of the imaging lens module should be improved, but the precision in manufacturing and assembling also needs to be improved.

SUMMARY

According to one aspect of the present disclosure, a plastic barrel, which surrounds a central axis, includes an object-side portion and a tubular portion. The object-side portion includes an object-side opening and a reverse inclined structure. The object-side opening is a smallest opening of the plastic barrel. The reverse inclined structure surrounds the object-side opening and includes a reverse inclined surface and at least one annular concave structure. The reverse inclined surface gradually expands from the object-side opening toward an image side. The at least one annular concave structure is disposed on an object side of the reverse inclined surface and is recessed from the object-side opening along a direction away from the central axis, wherein a sectional surface of the at least one annular concave structure passing through the central axis includes a valley point and two concave ends, and the two concave ends are disposed on an object side and an image side of the valley point, respectively. The tubular portion is connected to the object-side portion and extends to the image side. The valley point is located on a position farthest from the central axis on the at least one annular concave structure. When a central distance between the valley point and the concave end disposed on the image side of the valley point is a1, a central distance between the two concave ends is a2, and a diameter of the object-side opening is ψ, the following conditions are satisfied:

$0.05 < a1/a2 < 0.95$; and $0.9 \text{ mm} < \psi < 3.2 \text{ mm}$.

According to another aspect of the present disclosure, an imaging lens module includes the plastic barrel according to the aforementioned aspect and an imaging lens assembly disposed in the plastic barrel.

According to another aspect of the present disclosure, an electronic device includes the imaging lens module according to the aforementioned aspect and an image sensor disposed on an image surface of the imaging lens module.

According to another aspect of the present disclosure, an imaging lens module, which has a central axis, includes a plastic barrel, a light blocking sheet and an imaging lens assembly. The plastic barrel surrounds the central axis and includes an object-side portion and a tubular portion. The object-side portion includes an object-side opening, a reverse inclined structure and an assembling surface, wherein the object-side opening is a smallest opening of the plastic barrel, and the reverse inclined structure surrounds the object-side opening and includes a reverse inclined surface and at least one annular concave structure. The reverse inclined surface gradually expands from the object-side opening toward an image side. The at least one annular concave structure is disposed on an object side of the reverse inclined surface and is recessed from the object-side opening along a direction away from the central axis, wherein a sectional surface of the at least one annular concave structure passing through the central axis includes a valley point and two concave ends, the two concave ends are disposed on an object side and an image side of the valley point, respectively, and the assembling surface surrounds the reverse inclined surface and is faced to the image side. The tubular portion is connected to the object-side portion and extends to the image side and the forms a containing space. The light blocking sheet is connected to the assembling surface and has a hole, wherein the hole is corresponding to the object-side opening. The imaging lens assembly is disposed in the containing space and has an optical axis, wherein the optical axis and the central axis are coaxial. The valley point is located on a position farthest from the central axis on the at least one annular concave structure. When a central distance between the valley point and the concave end disposed on the image side thereof is a1, a central distance between the two concave ends is a2, and a central distance between the light blocking sheet and the object-side opening is L, the following conditions are satisfied:

$0.05 < a1/a2 < 0.95$; and $0.2 \text{ mm} < L < 1.2 \text{ mm}$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
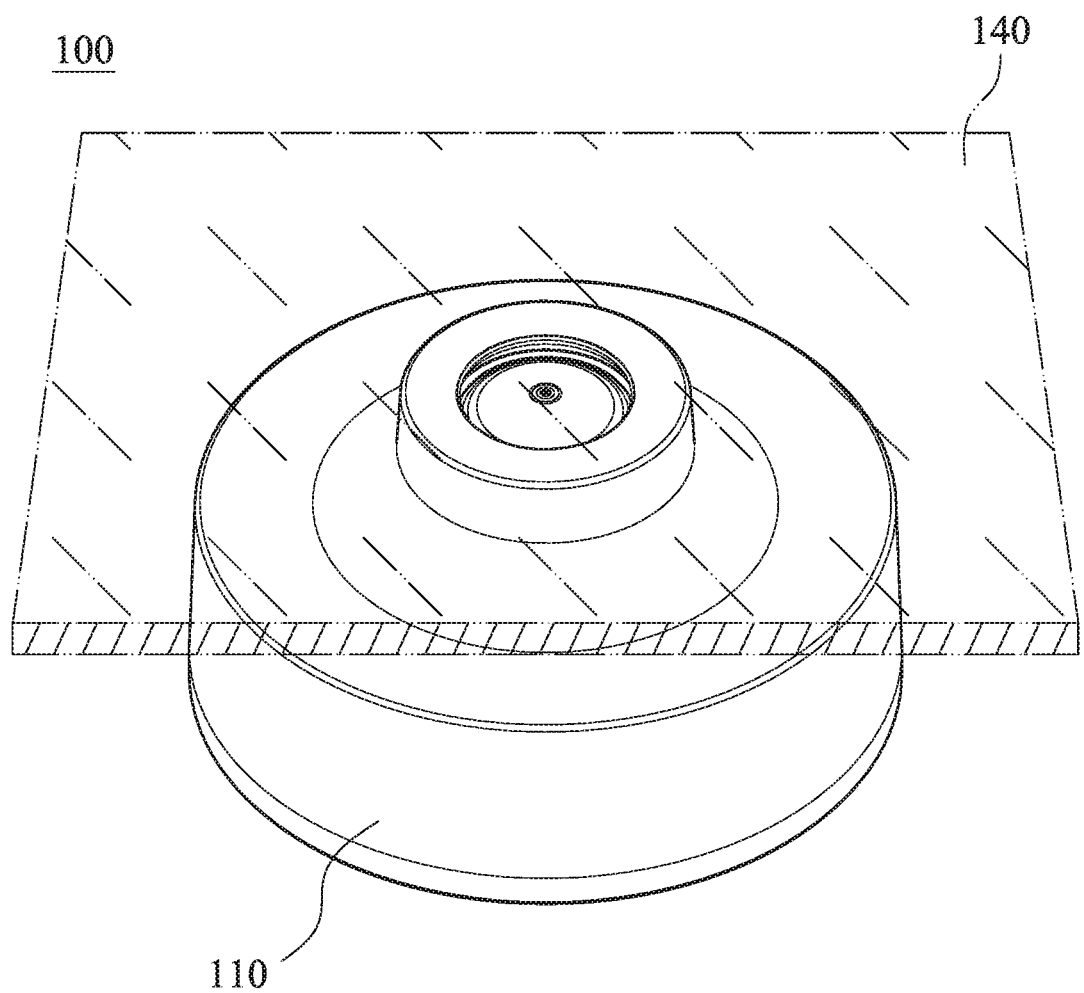
FIG. 1A is a three dimensional schematic view of an appearance of an imaging lens module according to the 1st embodiment of the present disclosure.

The present disclosure provides a plastic barrel, which surrounds a central axis, and the plastic barrel includes an object-side portion and a tubular portion, wherein the tubular portion is connected to the object-side portion and extends to an image side. The object-side portion includes an object-side opening and a reverse inclined structure. The object-side opening is a smallest opening of the plastic barrel. The reverse inclined structure surrounds the object-side opening and includes a reverse inclined surface and at least one annular concave structure, wherein the reverse inclined surface gradually expands from the object-side opening toward the image side, and the annular concave structure is disposed on an object side of the reverse inclined surface and is recessed from the object-side opening along a direction away from the central axis. A sectional surface of the annular concave structure passing through the central axis includes a valley point and two concave ends, and the two concave ends are disposed on an object side and an image side of the valley point, respectively. The valley point is located on a position farthest from the central axis on the annular concave structure. In detail, the design of the reverse inclined structure is for reducing the short shot of the filler during the injection molding method of the object-side opening, and it is favorable for drafting the mold thereof. Furthermore, by the arrangement of the reverse inclined structure, it is favorable for controlling the pathway of the non-imaging light with large angle. The arrangement of annular concave structure is recessed from a reference surface parallel to an optical axis toward the plastic barrel, and the annular concave structure belongs to an elastic drafting structure, wherein the disposing area thereof is close to the object side and away from the image side. Therefore, by the arrangement of the front end portion of the plastic barrel, it is favorable for effectively suppressing potential surface reflections of the near-light with large angle so as to support the optical design of front-pushing aperture stop. Moreover, the annular concave structure can include a matte surface. Therefore, the anti-reflective structure can be more stereoscopic by the annular concave structure and can be without being limited by the traditional injection molding drafting requirements. Furthermore, it is favorable for providing the processing technology for preparing the elastic drafting structure so as to reduce the high-intensity reflected light around the object-side opening.

When a central distance between the valley point and the concave end disposed on the image side thereof is a1, and a central distance between the two concave ends is a2, the following condition is satisfied: $0.05 < a1/a2 < 0.95$. Therefore, the molding success rate of the plastic barrel can be enhanced. Furthermore, the following condition can be satisfied: $0.10 < a1/a2 < 0.75$. Therefore, the molding success rate can be further enhanced. Furthermore, the following condition can be satisfied: $0.10 < a1/a2 < 0.50$. Therefore, the molding success rate can be further enhanced, and it is favorable for enhancing the suppressing effectivity of the stray light.

When a diameter of the object-side opening is $\psi$, the following condition is satisfied: $0.9 \text{ mm} < \psi < 3.2 \text{ mm}$. Therefore, the manufacturability of the miniaturized imaging lens module can be provided. Furthermore, the following condition can be satisfied: $1.4 \text{ mm} < \psi < 2.8 \text{ mm}$. Therefore, the manufacturing standards of elastic drafting ratio (EDR) can be satisfied by a proper pore size so as to maintain the molding quality and size accuracy of the plastic barrel, and it is favorable for achieving the anti-reflective propriety of the elastic drafting structure.

The plastic barrel can be made of a black plastic material and can be formed by an injection molding method, and the plastic barrel can further include at least two injection traces. Therefore, it is favorable for improving the molding uniformity and symmetry of the plastic barrel.

When an angle between the reverse inclined structure and the central axis is $\theta$, the following condition can be satisfied: $5 \text{ degrees} < \theta < 45 \text{ degrees}$. Therefore, it is favorable for providing the drafting angle required for demolding.

When a number of the annular concave structures is N, the following condition can be satisfied: $1 \leq N \leq 15$. Therefore, the denseness of the annular concave structures can be provided. Furthermore, the following condition can be satisfied: $1 \leq N \leq 10$. Therefore, it is favorable for providing a better number range of the annular concave structures for the molding quality and the suppressing effectivity of the stray light.

The number of the annular concave structures is at least two, in the one of the at least two annular concave structures which is closest to the object-side opening, a distance between the valley point thereof and the central axis is D, a distance between the concave end disposed on the image side of the valley point thereof and the central axis is d, an elastic drafting ratio is defined as EDR, and the following condition can be satisfied: $0.0\% < EDR < 5.0\%$, wherein $EDR = [(D-d)/D] \times 100\%$. Therefore, a proper range of the elastic drafting ratio can be maintained, so that the function of the elastic drafting structure can be played more ideally.

In the two concave ends, the concave end disposed on the image side of the valley point is farther from the central axis than the concave end disposed on the object side of the valley point. Therefore, it is favorable for reducing the collision and interference between the plastic barrel and the corresponding mold during the demolding process so as to enhance the yield of products.

Each of the aforementioned features of the plastic barrel of the present disclosure can be utilized in numerous combinations, so as to achieve the corresponding functionality.

The present disclosure provides an imaging lens module including the aforementioned plastic barrel and an imaging lens assembly, wherein the imaging lens assembly is disposed in the plastic barrel.

In detail, the imaging lens module includes the plastic barrel, a light blocking sheet and an imaging lens assembly. The plastic barrel surrounds the central axis and includes an object-side portion and a tubular portion, wherein the tubular portion is connected to the object-side portion and extends to the image side and then forms a containing space. The object-side portion includes an object-side opening, a reverse inclined structure and an assembling surface, wherein the object-side opening is a smallest opening of the plastic barrel, and the reverse inclined structure surrounds the object-side opening and includes a reverse inclined surface and at least one annular concave structure. The reverse inclined surface gradually expands from the object-side opening toward an image side, and the annular concave structure is disposed on an object side of the reverse inclined surface and is recessed from the object-side opening along a direction away from the central axis. A sectional surface of the annular concave structure passing through the central axis includes a valley point and two concave ends, the two concave ends are disposed on an object side and an image side of the valley point, respectively, and the assembling surface surrounds the reverse inclined surface and is faced to the image side. The light blocking sheet is connected to the assembling surface and has a hole, wherein the hole is corresponding to the object-side opening. The imaging lens assembly is disposed in the containing space and has an optical axis, wherein the optical axis and the central axis are coaxial. The valley point is located on a position farthest from the central axis on the annular concave structure. In detail, the pathway of the non-imaging light with large angle can be controlled more easily by the reverse inclined structure, and the reverse inclined structure can be further combined with the light blocking sheet so as to form a matting trap, so that it is favorable for eliminating the non-imaging light with large angle and then reducing the reflection of the internal stray light of the imaging lens module. Furthermore, the annular concave structure can include a matte surface. Therefore, the anti-reflective structure can be more stereoscopic by the annular concave structure and can be without being limited by the traditional injection molding drafting requirements. Furthermore, it is favorable for providing the processing technology for preparing the elastic drafting structure so as to reduce the high-intensity reflected light around the object-side opening.

When a central distance between the valley point and the concave end disposed on the image side thereof is a1, and a central distance between the two concave ends is a2, the following condition is satisfied: $0.05 < a1/a2 < 0.95$. Therefore, the molding success rate of the plastic barrel can be enhanced. Furthermore, the following condition can be satisfied: $0.10 < a1/a2 < 0.75$. Therefore, the molding success rate can be further enhanced. Furthermore, the following condition can be satisfied: $0.10 < a1/a2 < 0.50$. Therefore, the molding success rate can be further enhanced, and it is favorable for enhancing the suppressing effectivity of the stray light.

When a central distance between the light blocking sheet and the object-side opening is L, the following condition is satisfied: $0.2 \text{ mm} < L < 1.2 \text{ mm}$. Therefore, the manufacturability of the miniaturized imaging lens module can be provided.

The imaging lens module can further include a transparent plate. The transparent plate is disposed on an object side of the plastic barrel. Therefore, the imaging lens module can be more suitable for applying in the miniaturized lens module of compact electronic devices. Furthermore, the transparent plate can be a glass baseplate, a display panel or a protection board, and the present disclosure is not limited thereto. Furthermore, the transparent plate can be a plate with a display function, such as an under-screen lens module, so as to provide a manufacturing feasibility of the under-screen lens module.

The reverse inclined structure is not connected with the imaging lens assembly. Therefore, it is favorable for preventing the damage of the overall structure during the assembling process thereof so as to ensure the structural integrity thereof.

The light blocking sheet has an object-side surface faced to the object side and an image-side surface faced to the image side, wherein the object-side surface is contacted with the assembling surface, and the image-side surface is contacted with the imaging lens assembly. Therefore, it is favorable for increasing the efficiency for shielding the non-imaging light so as to suppress the non-imaging light entering the imaging lens assembly.

A number of the annular concave structures can be at least two, in the one of the at least two annular concave structures which is closest to the object-side opening, a distance between the valley point thereof and the central axis is D, a distance between the concave end disposed on the image side of the valley point thereof and the central axis is d, an elastic drafting ratio is defined as EDR, and the following condition can be satisfied: $0.0\% < EDR < 5.0\%$, wherein $EDR = [(D-d)/D] \times 100\%$. Therefore, a proper range of the elastic drafting ratio can be maintained, so that the function of the elastic drafting structure can be played more ideally.

In the two concave ends, the concave end disposed on the image side of the valley point is farther from the central axis than the concave end disposed on the object side of the valley point. Therefore, it is favorable for reducing the collision and interference between the plastic barrel and the corresponding mold during the demolding process so as to enhance the yield of products.

The imaging lens assembly can include a plurality of lens elements, and a number of the lens elements can be more than or equal to four and less than or equal to ten. Therefore, the imaging lens module with resolution can be provided.

When a focal length of the imaging lens assembly is f, and a diameter of the object-side opening is ψ, the following condition is satisfied: 1.0<f/ψ<2.7. Therefore, a better light-collecting effectivity can be provided. Furthermore, the following condition can be satisfied: 1.2<f/ψ<2.1. Therefore, it is favorable for achieving a high specification of optical quality under the arrangement of the miniaturized lens module, and a better light-collecting effectivity can be maintained.

Furthermore, the object-side opening of the plastic barrel can be an aperture stop of the imaging lens module. Therefore, the amount of light entering the imaging lens module can be controlled by the size of the object-side opening, so that it is favorable for achieving the miniaturization of the lens module.

Each of the aforementioned features of the imaging lens module of the present disclosure can be utilized in numerous combinations, so as to achieve the corresponding functionality.

The present disclosure further provides an electronic device including the aforementioned imaging lens module and an image sensor, and the image sensor is disposed on an image surface of the imaging lens module. Therefore, it is favorable for providing an electronic device which is miniaturized and has better image quality.

1st Embodiment

Figure 1B:
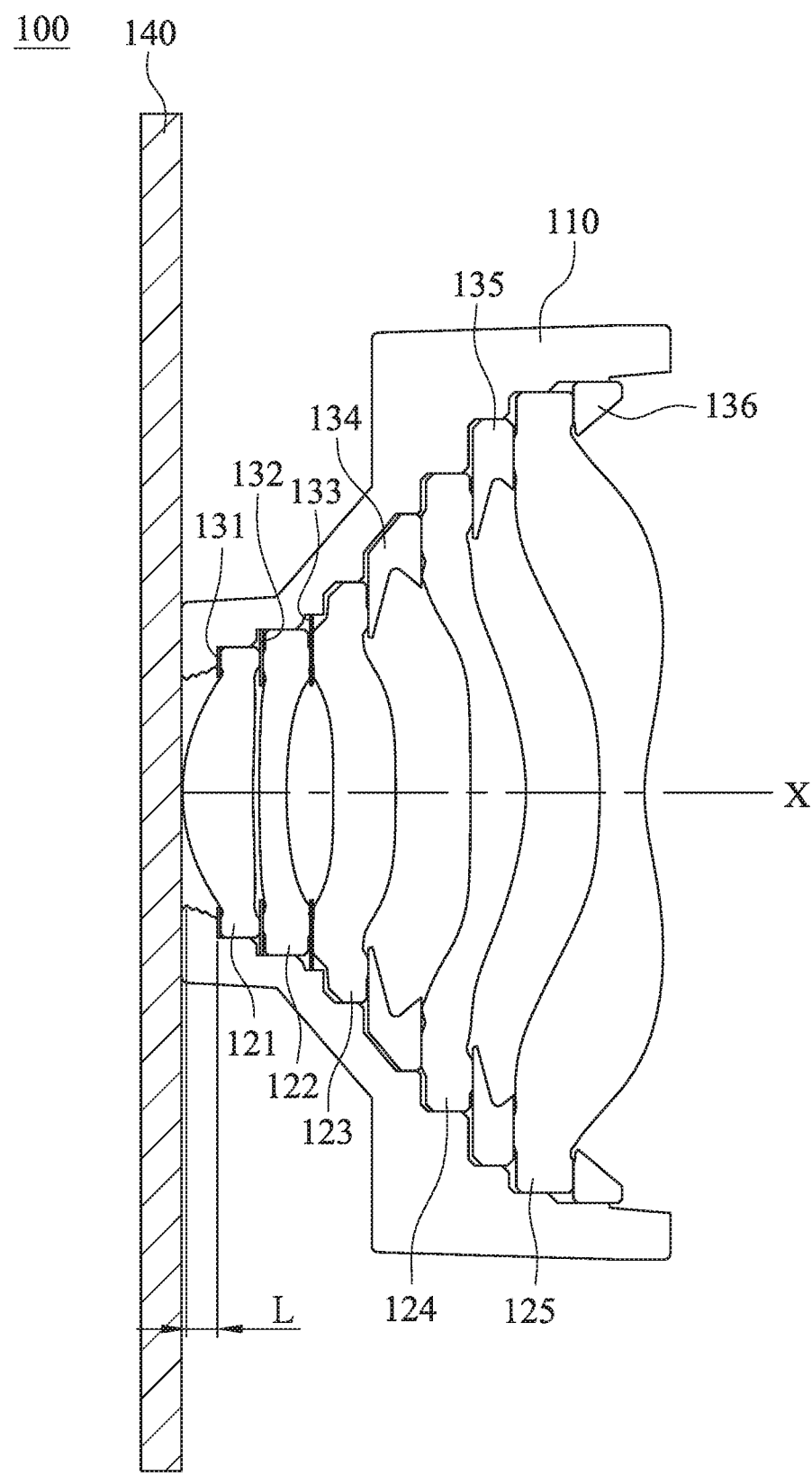
FIG. 1B is a schematic view of the imaging lens module according to the 1st embodiment of FIG. 1A.

FIG. 1A is a three dimensional schematic view of an appearance of an imaging lens module 100 according to the 1st embodiment of the present disclosure. FIG. 1B is a schematic view of the imaging lens module 100 according to the 1st embodiment of FIG. 1A. As shown in FIG. 1A and FIG. 1B, the imaging lens module 100 has a central axis X and includes a transparent plate 140, a plastic barrel 110, a plurality of light blocking elements (reference number are omitted) and an imaging lens assembly (reference number is omitted). The transparent plate 140 is disposed on an object side of the plastic barrel 110, the transparent plate 140 can be a plate with a display function, and the light blocking elements and the imaging lens assembly are disposed in the plastic barrel 110.

Figure 1C:
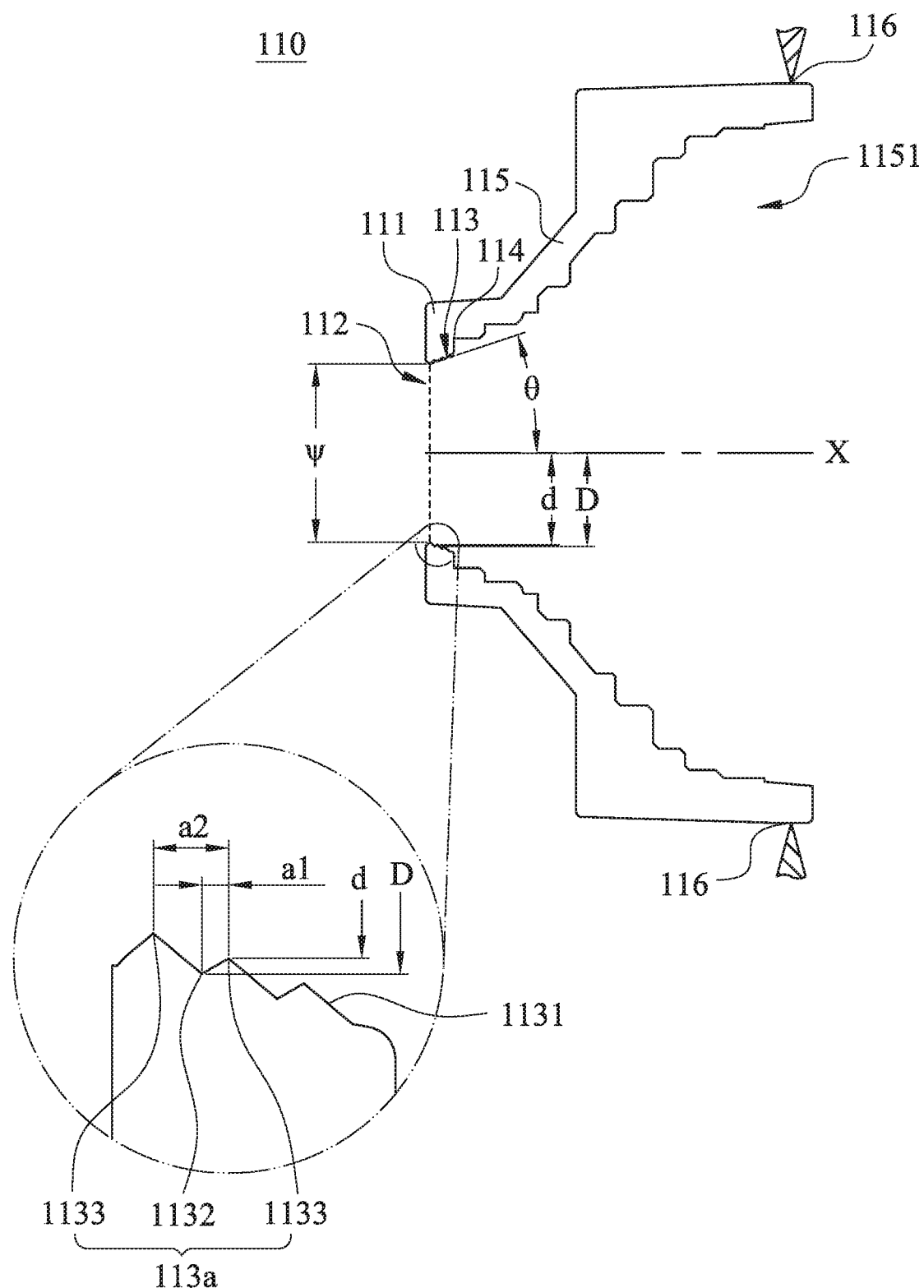
FIG. 1C is a schematic view of a plastic barrel according to the 1st embodiment of FIG. 1A.

FIG. 1C is a schematic view of the plastic barrel 110 according to the 1st embodiment of FIG. 1A. As shown in FIG. 1C, the plastic barrel 110 surrounds the central axis X and includes an object-side portion 111 and a tubular portion 115, wherein the tubular portion 115 is connected to the object-side portion 111 and extends to the image side and then forms a containing space 1151. The object-side portion 111 includes an object-side opening 112, a reverse inclined structure 113 and an assembling surface 114, wherein the object-side opening 112 is a smallest opening of the plastic barrel 110, the reverse inclined structure 113 surrounds the object-side opening 112, and the assembling surface 114 surrounds the reverse inclined structure 113 and is faced to the image side. In the 1st embodiment, the object-side opening 112 is an aperture stop of the imaging lens module.

The reverse inclined structure 113 includes a reverse inclined surface 1131 and at least one annular concave structure 113a. In detail, in the 1st embodiment, a number of the annular concave structure 113a is two. The reverse inclined surface 1131 gradually expands from the object-side opening 112 toward an image side, and the annular concave structures 113a are disposed on an object side of the reverse inclined surface 1131 and are recessed from the object-side opening 112 along a direction away from the central axis X. A sectional surface of each of the annular concave structures 113a passing through the central axis X includes a valley point 1132 and two concave ends 1133, the two concave ends 1133 are disposed on an object side and an image side of the valley point 1132, respectively, and the valley point 1132 is located on a position farthest from the central axis X on the annular concave structures 113a. In the two concave ends 1133, the concave end 1133 disposed on the image side of the valley point 1132 is farther from the central axis X than the concave end 1133 disposed on the object side of the valley point 1132. Furthermore, the annular concave structures 113a have a matte surface.

As shown in FIG. 1B, the imaging lens assembly and the light blocking elements are disposed in the containing space 1151 of the tubular portion 115, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 1st embodiment, the imaging lens assembly includes five lens elements being, in order from an object side to an image side, a first lens element 121, a second lens element 122, a third lens element 123, a fourth lens element 124 and a fifth lens element 125. Furthermore, in the 1st embodiment, the light blocking elements are, in order from the object side to the image side, a light blocking sheet 131, a light blocking sheet 132, a light blocking sheet 133, a spacer 134, a spacer 135 and a retainer 136.

Figure 1D:
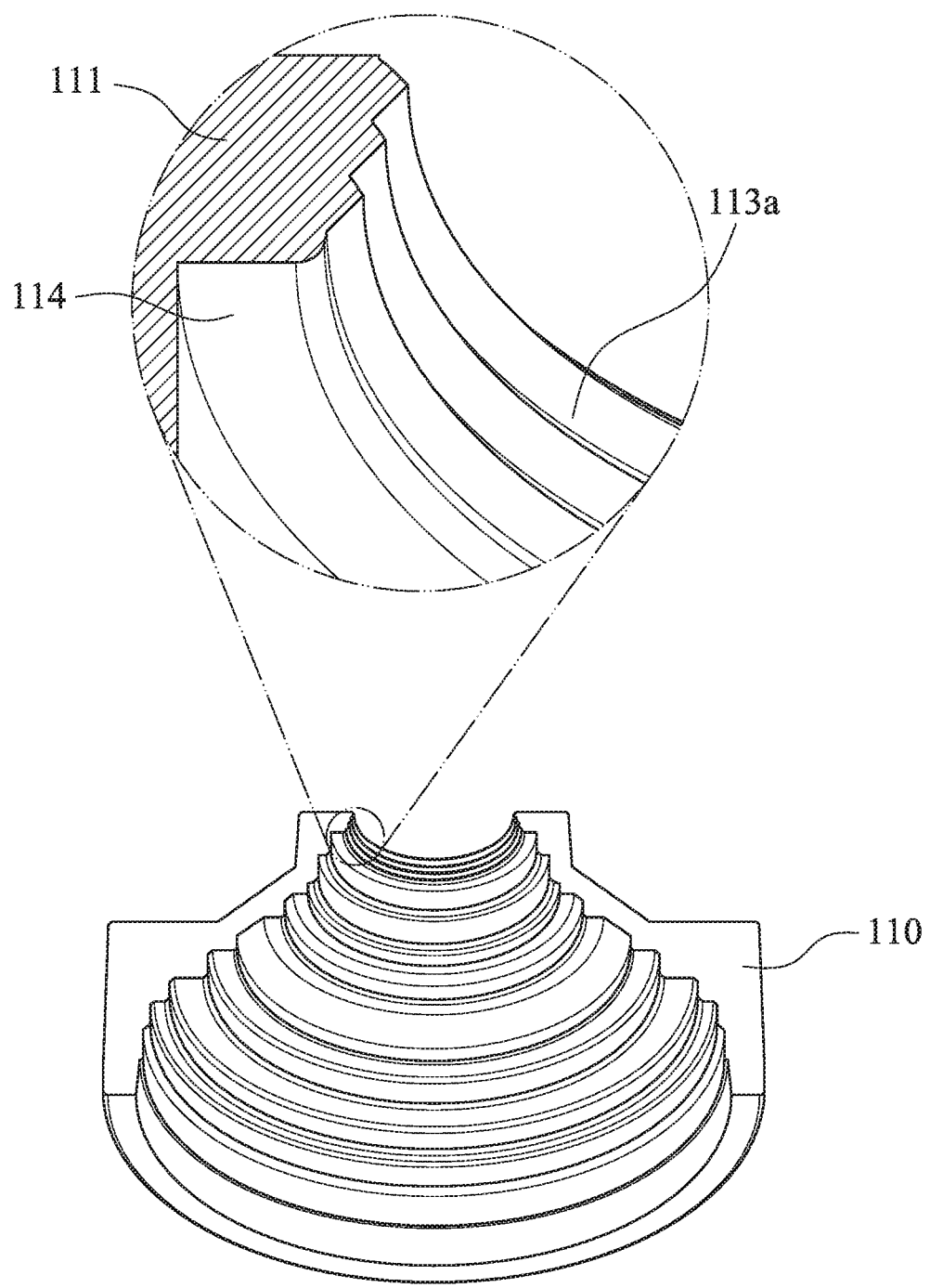
FIG. 1D is a cross-sectional view of the plastic barrel according to the 1st embodiment of FIG. 1A.
Figure 1E:
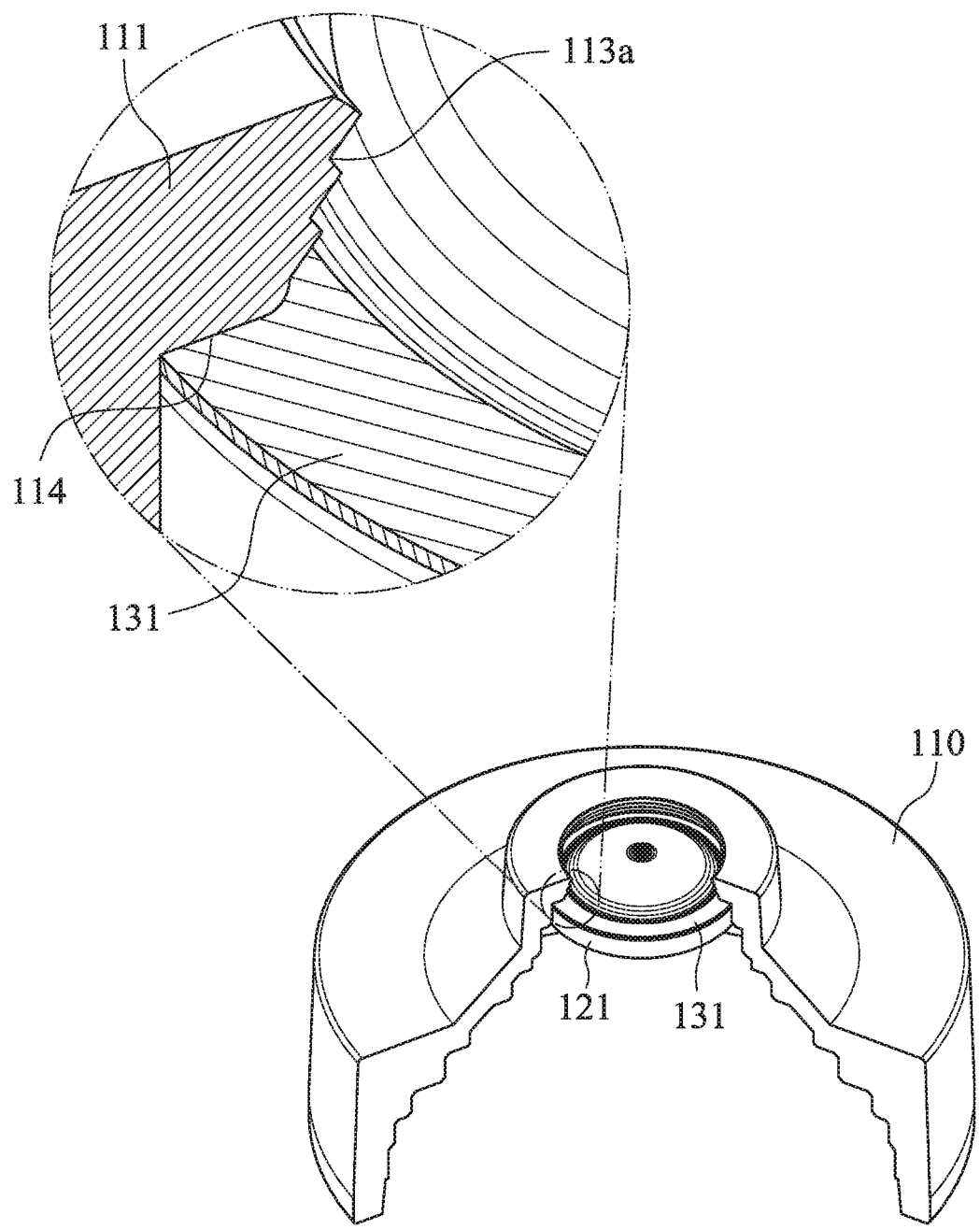
FIG. 1E is a schematic view of the plastic barrel, a first lens element and a light blocking sheet according to the 1st embodiment of FIG. 1A.

FIG. 1D is a cross-sectional view of the plastic barrel 110 according to the 1st embodiment of FIG. 1A. FIG. 1E is a schematic view of the plastic barrel 110, the first lens element 121 and the light blocking sheet 131 according to the 1st embodiment of FIG. 1A. As shown in FIG. 1B, FIG. 1D and FIG. 1E, the assembling surface 114 surrounds the reverse inclined surface 1131 and is faced to the image side, the light blocking sheet 131 is connected to the assembling surface 114 and has a hole (reference number is omitted), and the hole is corresponding to the object-side opening 112. Furthermore, due to the light blocking sheet 131 is disposed on an object side of the first lens element 121, the reverse inclined structure 113 can be not contacted with the first lens element 121. In other words, by the arrangement of the light blocking sheet 131, the reverse inclined structure 113 can be not contacted with the imaging lens assembly. In detail, the light blocking sheet 131 has an object-side surface (reference number is omitted) faced to an object side and an image-side surface (reference number is omitted) faced to the image side, wherein the object-side surface of the light blocking sheet 131 is contacted with the assembling surface 114, and the image-side surface of the light blocking sheet 131 is contacted with the imaging lens assembly (that is, the image-side surface of the light blocking sheet 131 is contacted with the first lens element 121).

Figure 1F:
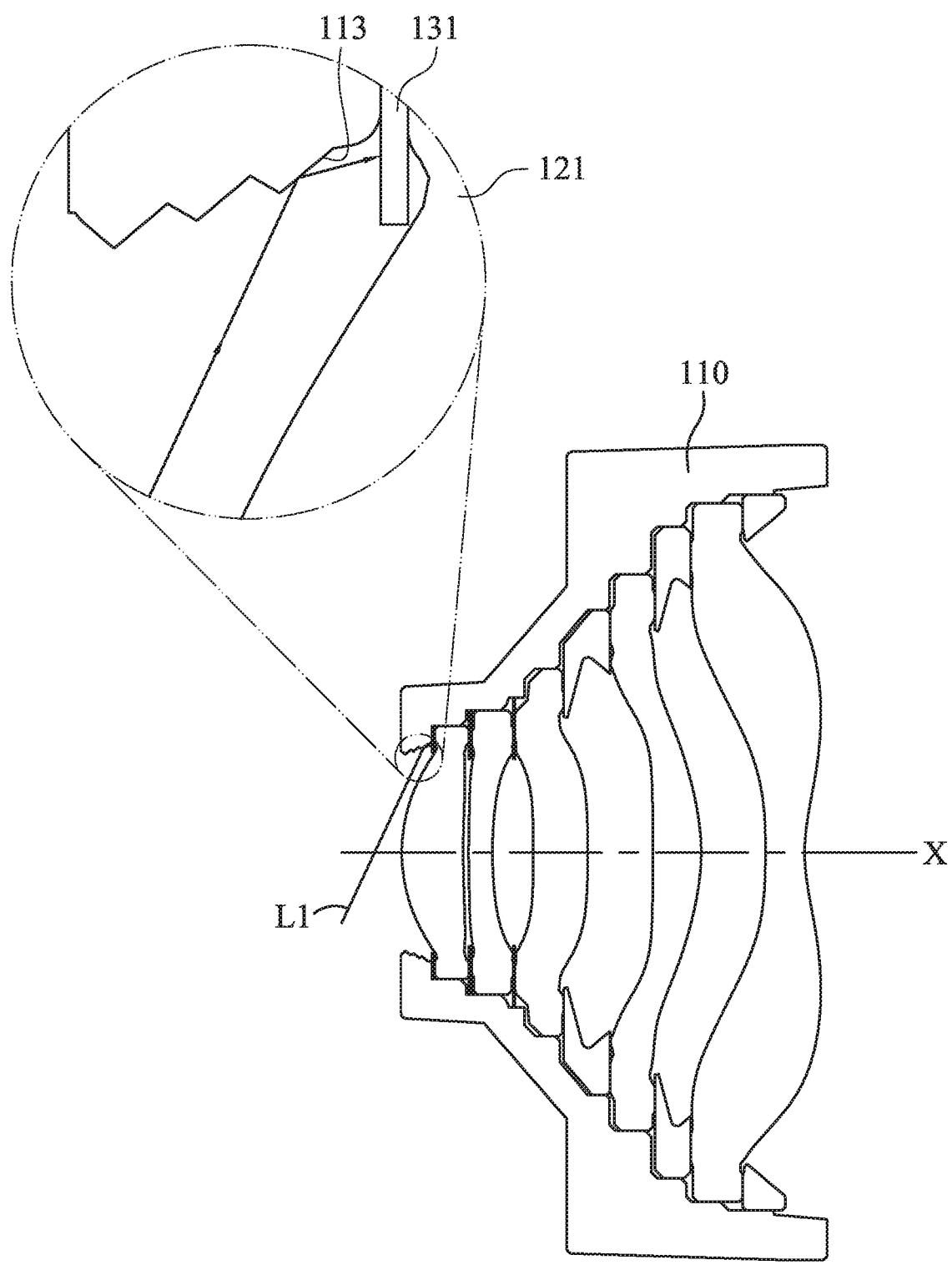
FIG. 1F is a schematic view of a non-imaging light being incident into the imaging lens module according to the 1st embodiment of FIG. 1A.

FIG. 1F is a schematic view of a non-imaging light L1 being incident into the imaging lens module 100 according to the 1st embodiment of FIG. 1A. As shown in FIG. 1F, when the non-imaging light L1 with large angle is incident into the imaging lens module 100, the non-imaging light L1 with large angle will be reflected to the light blocking sheet 131 by the reverse inclined surface 1131 of the plastic barrel 110 so as to avoid the generation of the stray light and then affecting the image quality.

Figure 1G:
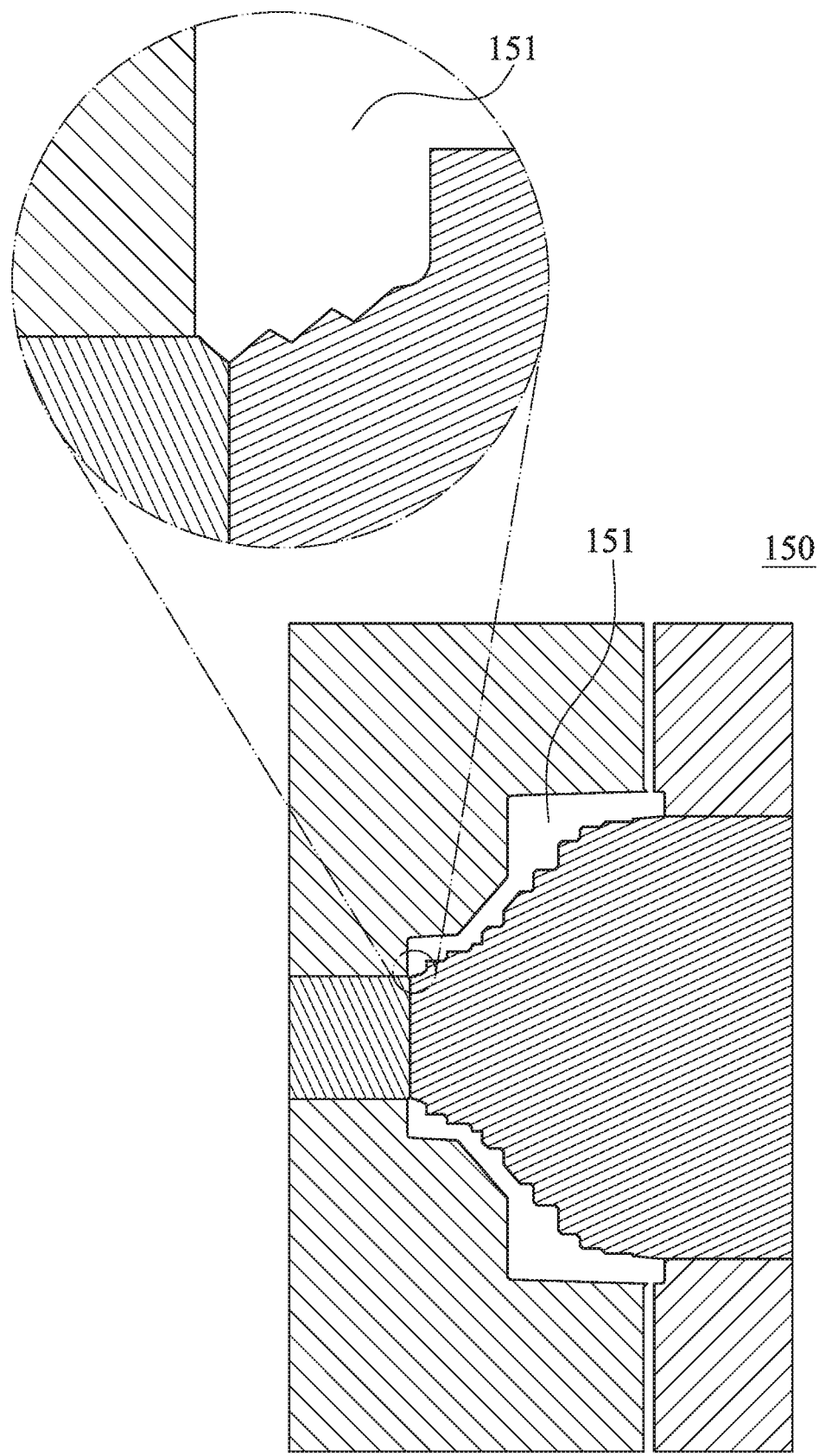
FIG. 1G is a schematic view of a mold of an injection molding method of the plastic barrel according to the 1st embodiment of FIG. 1A.

FIG. 1G is a schematic view of a mold of an injection molding method of the plastic barrel 110 according to the 1st embodiment of FIG. 1A. As shown in FIG. 1C and FIG. 1G, a mold 150 has an injecting space 151, and the plastic barrel 110 can be made of a black plastic material and formed by an injection molding method and then forming in the injecting space 151. The plastic barrel 110 can include at least two injection traces 116. Specifically, in the 1st embodiment, a number of the injection traces 116 is two.

According to FIG. 1B and FIG. 1C, a central distance between the valley point 1132 and the concave end 1133 disposed on the image side thereof is a1, a central distance between the two concave ends 1133 is a2, a diameter of the object-side opening 112 is $\psi$, an angle between the reverse inclined structure 113 and the central axis X is $\theta$, a number of the annular concave structures 113a is N, a central distance between the light blocking sheet 131 and the object-side opening 112 is L, and a focal length of the imaging lens assembly is f. Furthermore, in the one of the annular concave structures 113a which is closest to the object-side opening 112, a distance between the valley point 1132 thereof and the central axis X is D, a distance between the concave end 1133 disposed on the image side of the valley point 1132 thereof and the central axis X is d, and an elastic drafting ratio defined by D and d is EDR (EDR= [(D−d)/D]×100%). The aforementioned parameters can satisfy the following conditions listed in Table 1.

TABLE 1

1st Embodiment

| | | | |
|---|---|---|---|
| a1 (mm) | 0.025 | f (mm) | 3.74 |
| a2 (mm) | 0.070 | f/$\psi$ | 2.253 |
| a1/a2 | 0.36 | D (mm) | 0.868 |
| $\psi$ (mm) | 1.660 | d (mm) | 0.853 |
| $\theta$ (degrees) | 18 | EDR (%) | 1.7 |
| N | 2 | L (mm) | 0.225 |

2nd Embodiment

Figure 2A:
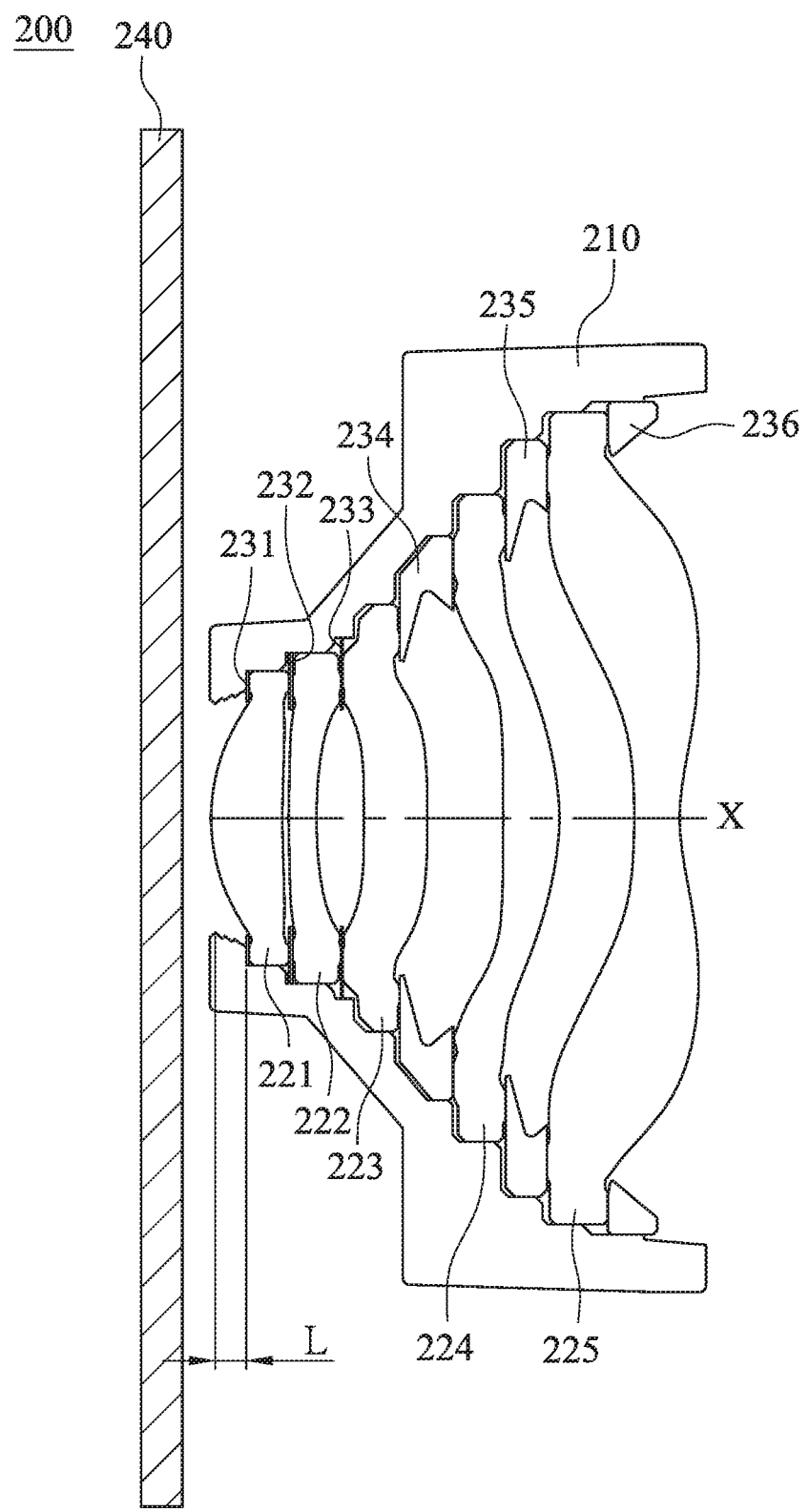
FIG. 2A is a schematic view of an imaging lens module according to the 2nd embodiment of the present disclosure.

FIG. 2A is a schematic view of an imaging lens module 200 according to the 2nd embodiment of the present disclosure. As shown in FIG. 2A, the imaging lens module 200 has a central axis X and includes a transparent plate 240, a plastic barrel 210, a plurality of light blocking elements (reference number are omitted) and a imaging lens assembly (reference number is omitted). The transparent plate 240 is disposed on an object side of the plastic barrel 210, the transparent plate 240 can be a plate with a display function, and the light blocking elements and the imaging lens assembly are disposed in the plastic barrel 210.

Figure 2B:
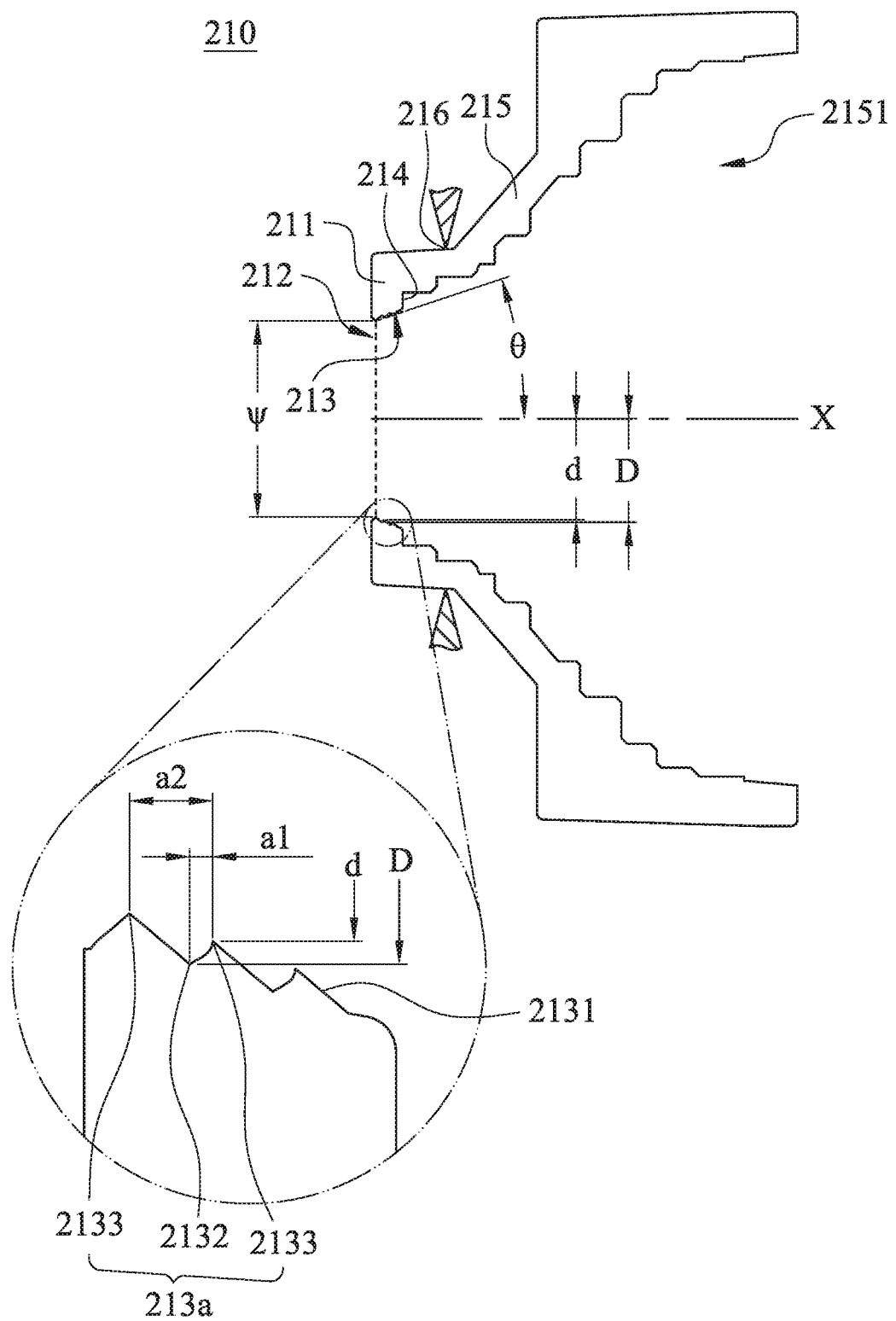
FIG. 2B is a schematic view of a plastic barrel according to the 2nd embodiment of FIG. 2A.

FIG. 2B is a schematic view of the plastic barrel 210 according to the 2nd embodiment of FIG. 2A. As shown in FIG. 2B, the plastic barrel 210 surrounds the central axis X and includes an object-side portion 211 and a tubular portion 215, wherein the tubular portion 215 is connected to the object-side portion 211 and extends to the image side and then forms a containing space 2151. The object-side portion 211 includes an object-side opening 212, a reverse inclined structure 213 and an assembling surface 214, wherein the object-side opening 212 is a smallest opening of the plastic barrel 210, the reverse inclined structure 213 surrounds the object-side opening 212, and the assembling surface 214 surrounds the reverse inclined structure 213 and is faced to the image side. In the 2nd embodiment, the object-side opening 212 is an aperture stop of the imaging lens module 200.

The reverse inclined structure 213 includes a reverse inclined surface 2131 and at least one annular concave structure 213a. In detail, in the 2nd embodiment, a number of the annular concave structure 213a is two. The reverse inclined surface 2131 gradually expands from the object-side opening 212 toward an image side, and the annular concave structures 213a are disposed on an object side of the reverse inclined surface 2131 and are recessed from the object-side opening 212 along a direction away from the central axis X. A sectional surface of each of the annular concave structures 213a passing through the central axis X includes a valley point 2132 and two concave ends 2133, the two concave ends 2133 are disposed on an object side and an image side of the valley point 2132, respectively, and the valley point 2132 is located on a position farthest from the central axis X on the annular concave structures 213a. In the two concave ends 2133, the concave end 2133 disposed on the image side of the valley point 2132 is farther from the central axis X than the concave end 2133 disposed on the object side of the valley point 2132. Furthermore, the annular concave structures 213a have a matte surface.

As shown in FIG. 2A, the imaging lens assembly and the light blocking elements are disposed in the containing space 2151 of the tubular portion 215, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 2nd embodiment, the imaging lens assembly includes five lens elements being, in order from an object side to an image side, a first lens element 221, a second lens element 222, a third lens element 223, a fourth lens element 224 and a fifth lens element 225. Furthermore, in the 2nd embodiment, the light blocking elements are, in order from the object side to the image side, a light blocking sheet 231, a light blocking sheet 232, a light blocking sheet 233, a spacer 234, a spacer 235 and a retainer 236.

Figure 2C:
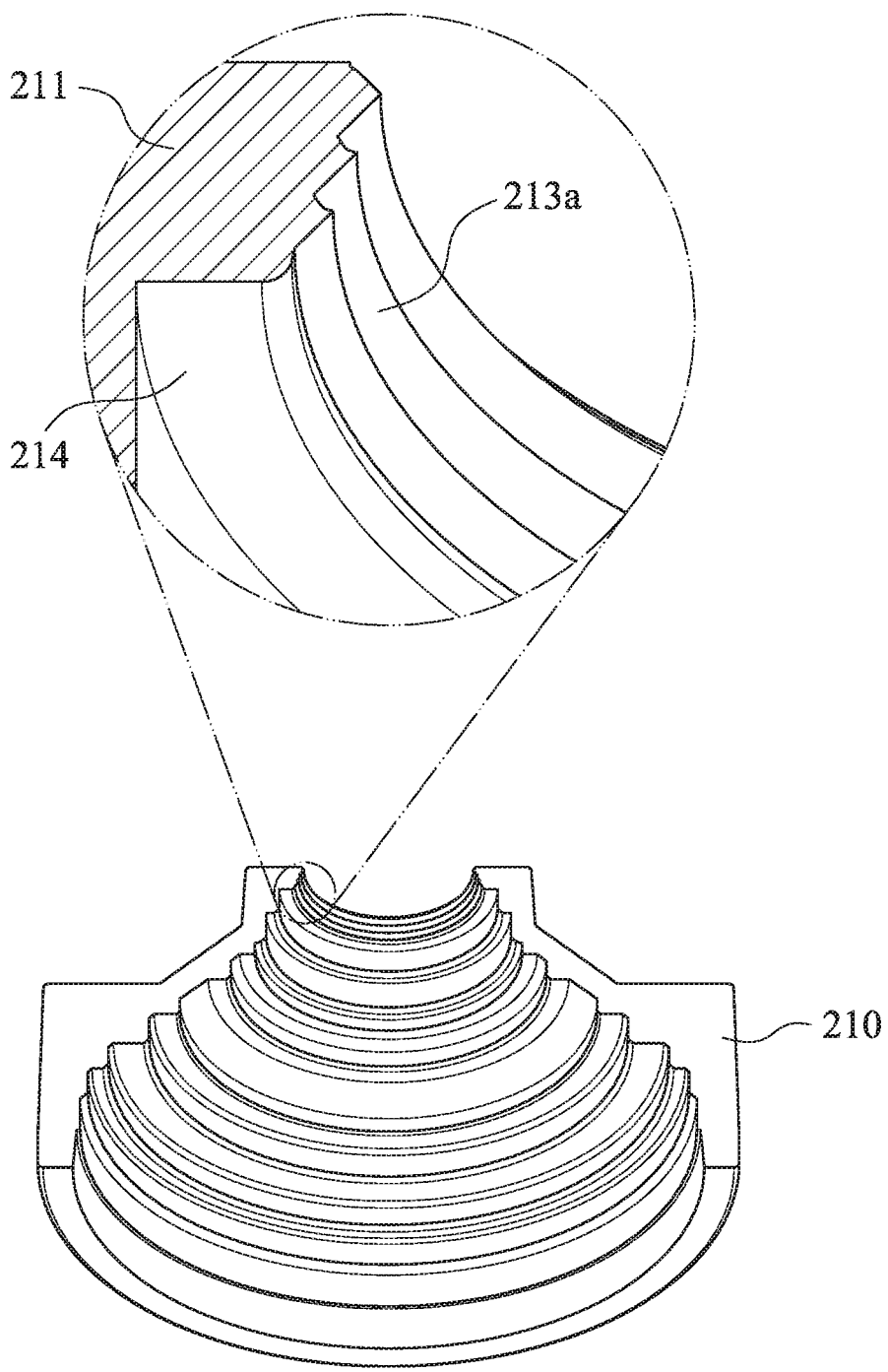
FIG. 2C is a cross-sectional view of the plastic barrel according to the 2nd embodiment of FIG. 2A.

FIG. 2C is a cross-sectional view of the plastic barrel 210 according to the 2nd embodiment of FIG. 2A. As shown in FIG. 2A and FIG. 2C, the assembling surface 214 surrounds the reverse inclined surface 2131 and is faced to the image side, the light blocking sheet 231 is connected to the assembling surface 214 and has a hole (reference number is omitted), and the hole is corresponding to the object-side opening 212. Furthermore, due to the light blocking sheet 231 is disposed on an object side of the first lens element 221, the reverse inclined structure 213 can be not contacted with the first lens element 221. In other words, by the arrangement of the light blocking sheet 231, the reverse inclined structure 213 can be not contacted with the imaging lens assembly. In detail, the light blocking sheet 231 has an object-side surface (reference number is omitted) faced to an object side and an image-side surface (reference number is omitted) faced to the image side, wherein the object-side surface of the light blocking sheet 231 is contacted with the assembling surface 214, and the image-side surface of the light blocking sheet 231 is contacted with the imaging lens assembly (that is, the image-side surface of the light blocking sheet 231 is contacted with the first lens element 221). When a non-imaging light with large angle is incident into the imaging lens module 200, the non-imaging light with large angle will be reflected to the light blocking sheet 231 by the reverse inclined surface 2131 of the plastic barrel 210 so as to avoid the generation of the stray light and then affecting the image quality.

Figure 2D:
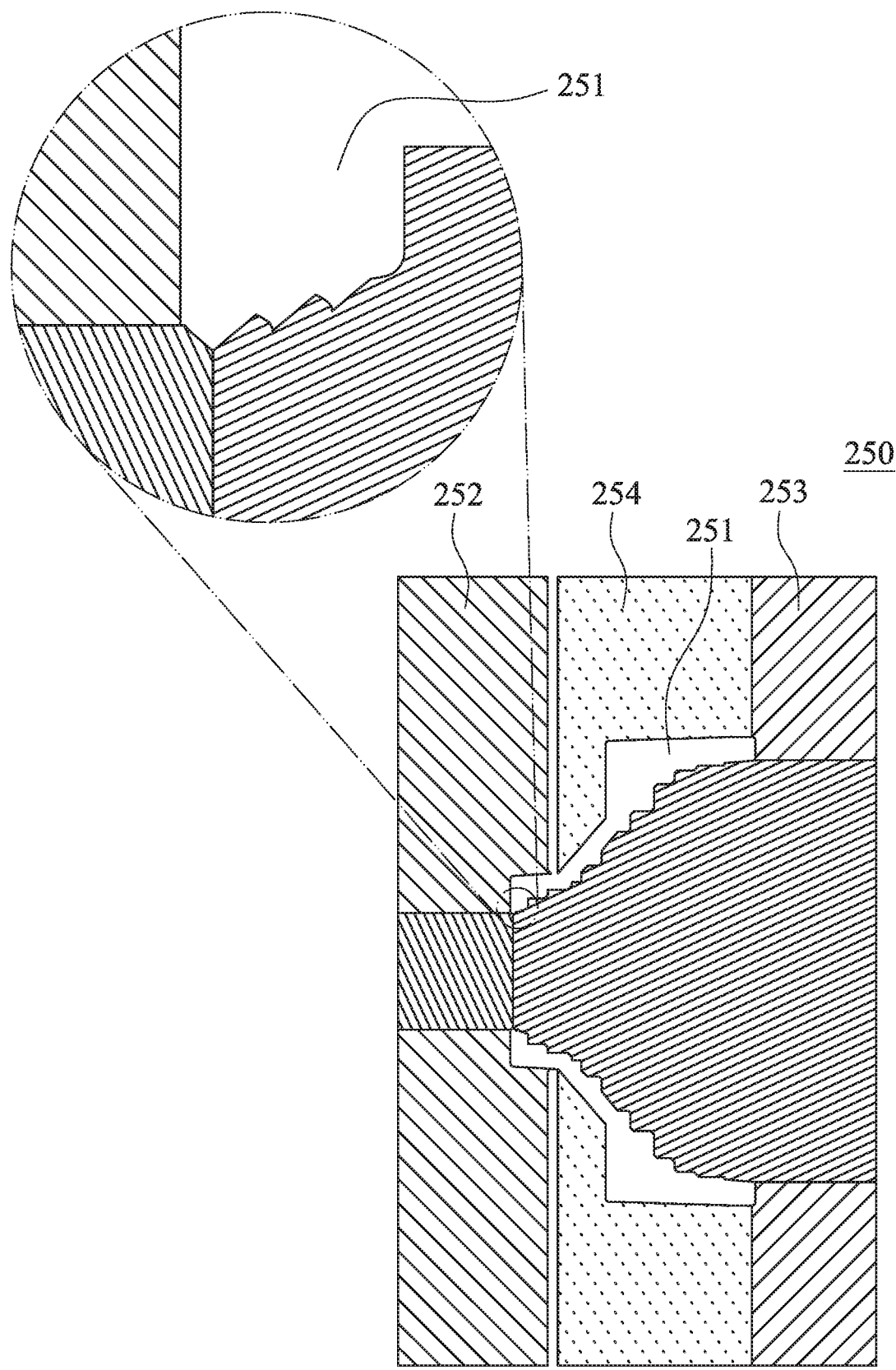
FIG. 2D is a schematic view of a mold of an injection molding method of the plastic barrel according to the 2nd embodiment of FIG. 2A.

FIG. 2D is a schematic view of a mold of an injection molding method of the plastic barrel 210 according to the 2nd embodiment of FIG. 2A. As shown in FIG. 2D, a mold 250 has an injecting space 251 and includes a fixed side element 252, a movable side element 253 and a sliding element 254, wherein the sliding element 254 is located between the fixed side element 252 and the movable side element 253. The plastic barrel 210 can be made of a black plastic material and formed by an injection molding method and then forming in the injecting space 251, wherein the movable side element 253 and the sliding element 254 are movable mold elements during the injection molding process, and the moving direction of the sliding element 254 and the moving direction of the movable side element 253 can be different. The plastic barrel 210 includes at least two injection traces 216. Specifically, in the 2nd embodiment, a number of the injection traces 216 is two.

According to FIG. 2A and FIG. 2B, a central distance between the valley point 2132 and the concave end 2133 disposed on the image side thereof is a1, a central distance between the two concave ends 2133 is a2, a diameter of the object-side opening 212 is ψ, an angle between the reverse inclined structure 213 and the central axis X is θ, a number of the annular concave structures 213a is N, a central distance between the light blocking sheet 231 and the object-side opening 212 is L, and a focal length of the imaging lens assembly is f. Furthermore, in the one of the annular concave structures 213a which is closest to the object-side opening 212, a distance between the valley point 2132 thereof and the central axis X is D, a distance between the concave end 2133 disposed on the image side of the valley point 2132 thereof and the central axis X is d, and an elastic drafting ratio defined by D and d is EDR (EDR= [(D−d)/D]×100%). The aforementioned parameters can satisfy the following conditions listed in Table 2.

TABLE 2

2nd Embodiment

| | | | |
|---|---|---|---|
| a1 (mm) | 0.019 | f (mm) | 3.74 |
| a2 (mm) | 0.070 | f/ψ | 2.253 |
| a1/a2 | 0.271 | D (mm) | 0.873 |
| ψ (mm) | 1.660 | d (mm) | 0.853 |
| θ (degrees) | 18 | EDR (%) | 2.3 |
| N | 2 | L (mm) | 0.225 |

3rd Embodiment

Figure 3A:
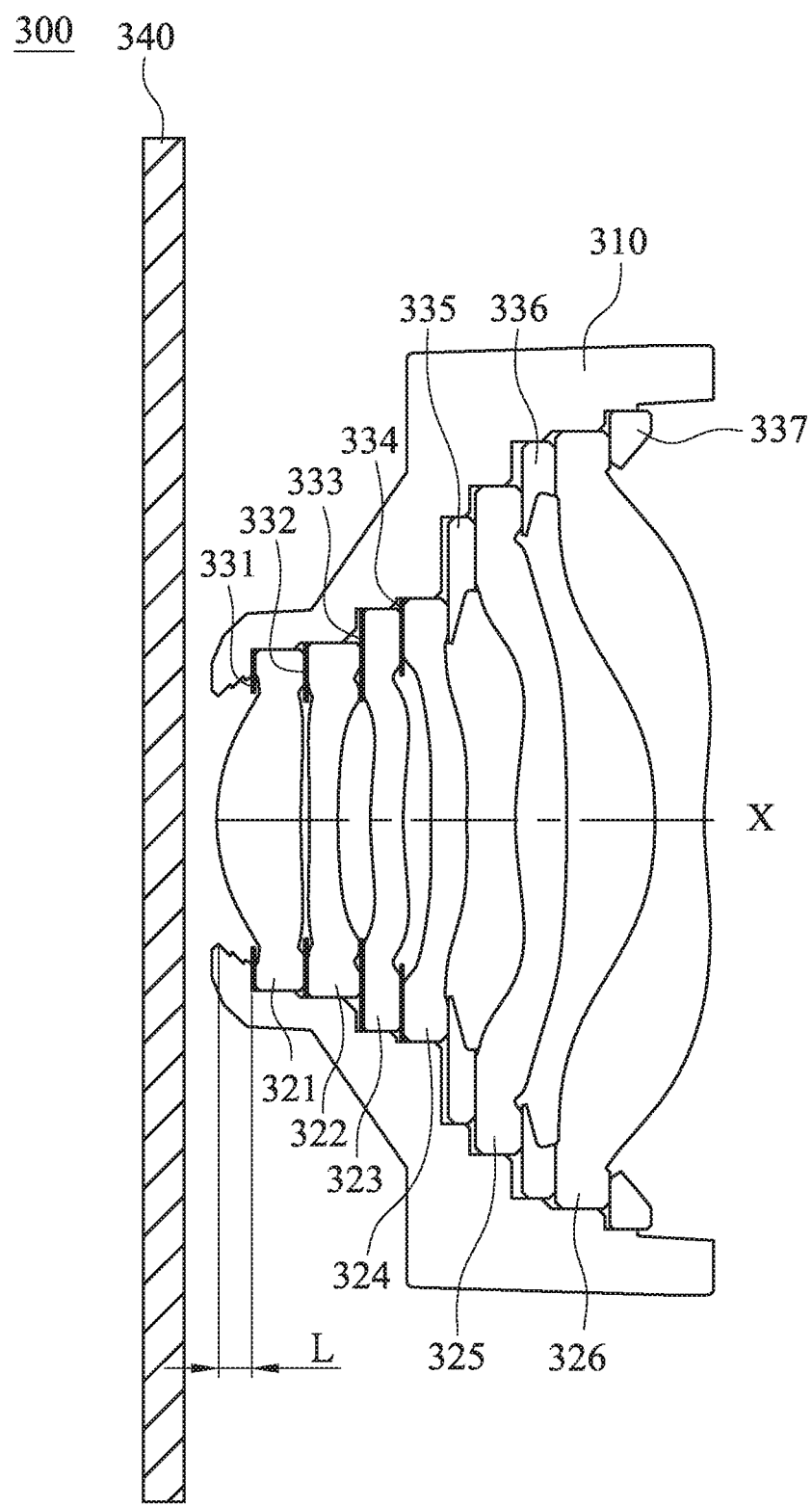
FIG. 3A is a schematic view of an imaging lens module according to the 3rd embodiment of the present disclosure.

FIG. 3A is a schematic view of an imaging lens module 300 according to the 3rd embodiment of the present disclosure. As shown in FIG. 3A, the imaging lens module 300 has a central axis X and includes a transparent plate 340, a plastic barrel 310, a plurality of light blocking elements (reference number are omitted) and an imaging lens assembly (reference number is omitted). The transparent plate 340 is disposed on an object side of the plastic barrel 310, the transparent plate 340 can be a plate with a display function, and the light blocking elements and the imaging lens assembly are disposed in the plastic barrel 310.

Figure 3B:
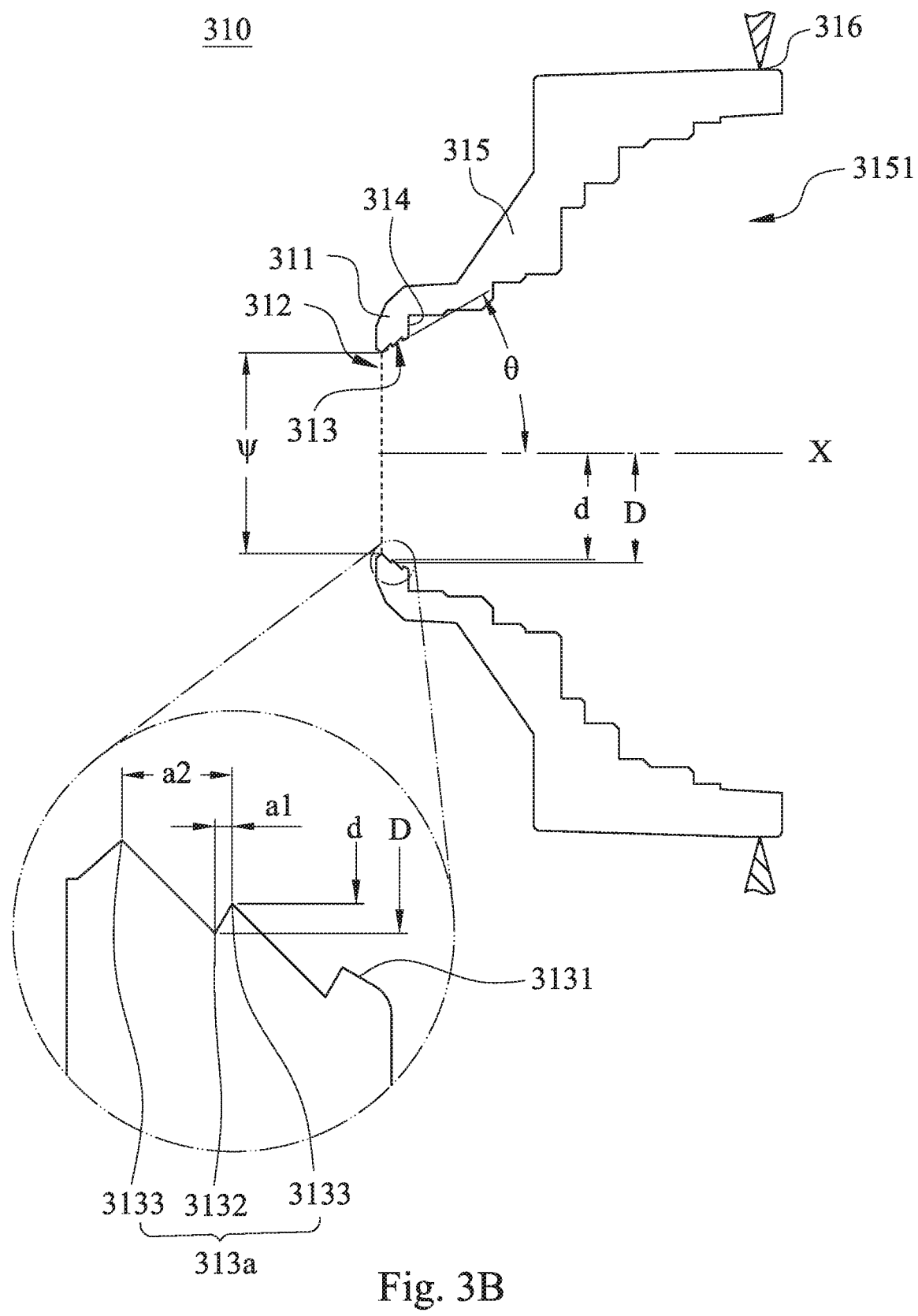
FIG. 3B is a schematic view of a plastic barrel according to the 3rd embodiment of FIG. 3A.

FIG. 3B is a schematic view of the plastic barrel 310 according to the 3rd embodiment of FIG. 3A. As shown in FIG. 3B, the plastic barrel 310 surrounds the central axis X and includes an object-side portion 311 and a tubular portion 315, wherein the tubular portion 315 is connected to the object-side portion 311 and extends to the image side and then forms a containing space 3151. The object-side portion 311 includes an object-side opening 312, a reverse inclined structure 313 and an assembling surface 314, wherein the object-side opening 312 is a smallest opening of the plastic barrel 310, the reverse inclined structure 313 surrounds the object-side opening 312, and the assembling surface 314 surrounds the reverse inclined structure 313 and is faced to the image side. In the 3rd embodiment, the object-side opening 312 is an aperture stop of the imaging lens module 300.

The reverse inclined structure 313 includes a reverse inclined surface 3131 and at least one annular concave structure 313a. In detail, in the 3rd embodiment, a number of the annular concave structure 313a is two. The reverse inclined surface 3131 gradually expands from the object-side opening 312 toward an image side, and the annular concave structures 313a are disposed on an object side of the reverse inclined surface 3131 and are recessed from the object-side opening 312 along a direction away from the central axis X. A sectional surface of each of the annular concave structures 313a passing through the central axis X includes a valley point 3132 and two concave ends 3133, the two concave ends 3133 are disposed on an object side and an image side of the valley point 3132, respectively, and the valley point 3132 is located on a position farthest from the central axis X on the annular concave structures 313a. In the two concave ends 3133, the concave end 3133 disposed on the image side of the valley point 3132 is farther from the central axis X than the concave end 3133 disposed on the object side of the valley point 3132. Furthermore, the annular concave structures 313a have a matte surface.

As shown in FIG. 3A, the imaging lens assembly and the light blocking elements are disposed in the containing space 3151 of the tubular portion 315, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 3rd embodiment, the imaging lens assembly includes six lens elements being, in order from an object side to an image side, a first lens element 321, a second lens element 322, a third lens element 323, a fourth lens element 324, a fifth lens element 325 and a six lens element 326. Furthermore, in the 3rd embodiment, the light blocking elements are, in order from the object side to the image side, a light blocking sheet 331, a light blocking sheet 332, a light blocking sheet 333, a light blocking sheet 334, a spacer 335, a spacer 336 and a retainer 337.

The assembling surface 314 surrounds the reverse inclined surface 3131 and is faced to the image side, the light blocking sheet 331 is connected to the assembling surface 314 and has a hole (reference number is omitted), and the hole is corresponding to the object-side opening 312. Furthermore, due to the light blocking sheet 331 is disposed on an object side of the first lens element 321, the reverse inclined structure 313 can be not contacted with the first lens element 321. In other words, by the arrangement of the light blocking sheet 331, the reverse inclined structure 313 can be not contacted with the imaging lens assembly. In detail, the light blocking sheet 331 has an object-side surface (reference number is omitted) faced to an object side and an image-side surface (reference number is omitted) faced to the image side, wherein the object-side surface of the light blocking sheet 331 is contacted with the assembling surface 314, and the image-side surface of the light blocking sheet 331 is contacted with the imaging lens assembly (that is, the image-side surface of the light blocking sheet 331 is contacted with the first lens element 321). When a non-imaging light with large angle is incident into the imaging lens module 300, the non-imaging light with large angle will be reflected to the light blocking sheet 331 by the reverse inclined surface 3131 of the plastic barrel 310 so as to avoid the generation of the stray light and then affecting the image quality.

The plastic barrel 310 is made of a black plastic material and formed by an injection molding method, and the plastic barrel 310 includes at least two injection traces 316. Specifically, in the 3rd embodiment, a number of the injection traces 316 is two.

According to FIG. 3A and FIG. 3B, a central distance between the valley point 3132 and the concave end 3133 disposed on the image side thereof is a1, a central distance between the two concave ends 3133 is a2, a diameter of the object-side opening 312 is ψ, an angle between the reverse inclined structure 313 and the central axis X is θ, a number of the annular concave structures 313a is N, a central distance between the light blocking sheet 331 and the object-side opening 312 is L, and a focal length of the imaging lens assembly is f. Furthermore, in the one of the annular concave structures 313a which is closest to the object-side opening 312, a distance between the valley point 3132 thereof and the central axis X is D, a distance between the concave end 3133 disposed on the image side of the valley point 3132 thereof and the central axis X is d, and an elastic drafting ratio defined by D and d is EDR (EDR= [(D−d)/D]×100%). The aforementioned parameters can satisfy the following conditions listed in Table 3.

TABLE 3

| 3rd Embodiment | | | |
|---|---|---|---|
| a1 (mm) | 0.015 | f (mm) | 3.78 |
| a2 (mm) | 0.100 | f/ψ | 2.077 |
| a1/a2 | 0.15 | D (mm) | 0.995 |
| ψ (mm) | 1.820 | d (mm) | 0.968 |
| θ (degrees) | 30 | EDR (%) | 2.7 |
| N | 2 | L (mm) | 0.245 |

4th Embodiment

Figure 4A:
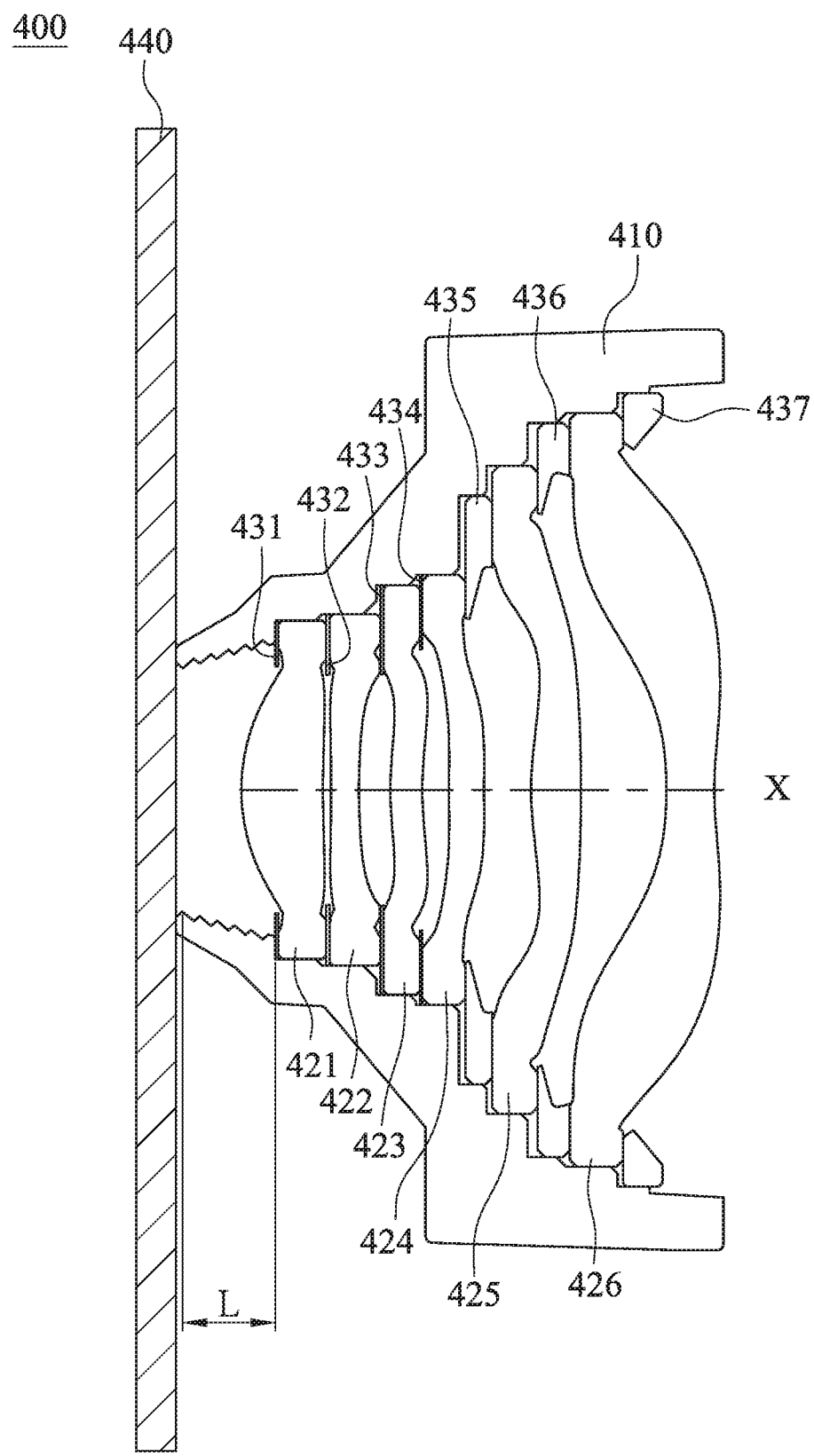
FIG. 4A is a schematic view of an imaging lens module according to the 4th embodiment of the present disclosure.

FIG. 4A is a schematic view of an imaging lens module 400 according to the 4th embodiment of the present disclosure. As shown in FIG. 4A, the imaging lens module 400 has a central axis X and includes a transparent plate 440, a plastic barrel 410, a plurality of light blocking elements (reference number are omitted) and an imaging lens assembly (reference number is omitted). The transparent plate 440 is disposed on an object side of the plastic barrel 410, the transparent plate 440 can be a plate with a display function, and light blocking elements and the imaging lens assembly are disposed in the plastic barrel 410.

Figure 4B:
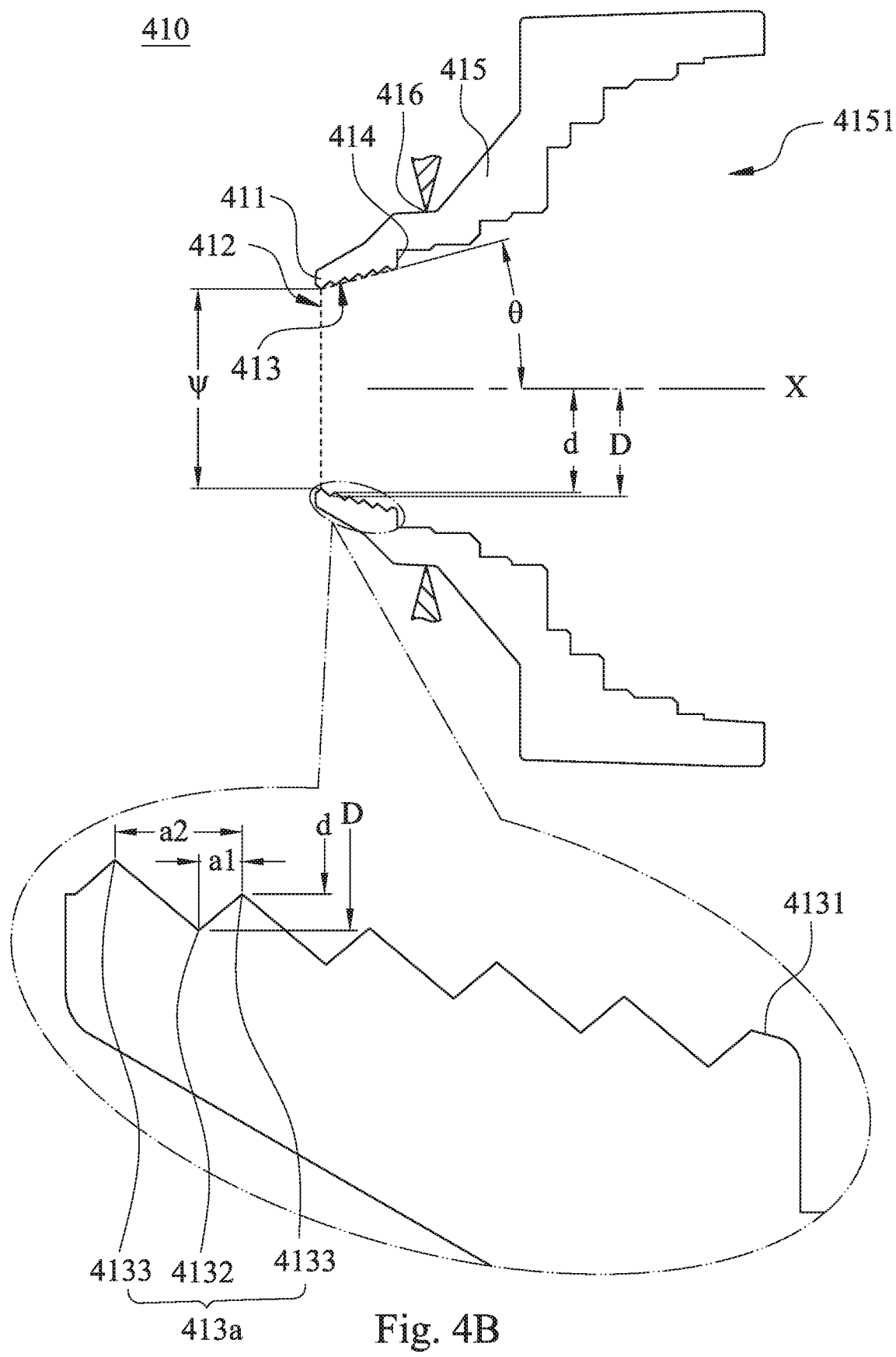
FIG. 4B is a schematic view of a plastic barrel according to the 4th embodiment of FIG. 4A.

FIG. 4B is a schematic view of the plastic barrel 410 according to the 4th embodiment of FIG. 4A. As shown in FIG. 4B, the plastic barrel 410 surrounds the central axis X and includes an object-side portion 411 and a tubular portion 415, wherein the tubular portion 415 is connected to the object-side portion 411 and extends to the image side and then forms a containing space 4151. The object-side portion 411 includes an object-side opening 412, a reverse inclined structure 413 and an assembling surface 414, wherein the object-side opening 412 is a smallest opening of the plastic barrel 410, the reverse inclined structure 413 surrounds the object-side opening 412, and the assembling surface 414 surrounds the reverse inclined structure 413 and is faced to the image side. In the 4th embodiment, the object-side opening 412 is an aperture stop of the imaging lens module 400.

The reverse inclined structure 413 includes a reverse inclined surface 4131 and at least one annular concave structure 413a. In detail, in the 4th embodiment, a number of the annular concave structure 413a is five. The reverse inclined surface 4131 gradually expands from the object-side opening 412 toward an image side, and the annular concave structures 413a are disposed on an object side of the reverse inclined surface 4131 and are recessed from the object-side opening 412 along a direction away from the central axis X. A sectional surface of each of the annular concave structures 413a passing through the central axis X includes a valley point 4132 and two concave ends 4133, the two concave ends 4133 are disposed on an object side and an image side of the valley point 4132, respectively, and the valley point 4132 is located on a position farthest from the central axis X on the annular concave structures 413a. In the two concave ends 4133, the concave end 4133 disposed on the image side of the valley point 4132 is farther from the central axis X than the concave end 4133 disposed on the object side of the valley point 4132. Furthermore, the annular concave structures 413a have a matte surface.

As shown in FIG. 4A, the imaging lens assembly and the light blocking elements are disposed in the containing space 4151 of the tubular portion 415, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 4th embodiment, the imaging lens assembly includes six lens elements being, in order from an object side to an image side, a first lens element 421, a second lens element 422, a third lens element 423, a fourth lens element 424, a fifth lens element 425 and a six lens element 426. Furthermore, in the 4th embodiment, the light blocking elements are, in order from the object side to the image side, a light blocking sheet 431, a light blocking sheet 432, a light blocking sheet 433, a light blocking sheet 434, a spacer 435, a spacer 436 and a retainer 437.

The assembling surface 414 surrounds the reverse inclined surface 4131 and is faced to the image side, the light blocking sheet 431 is connected to the assembling surface 414 and has a hole (reference number is omitted), and the hole is corresponding to the object-side opening 412. Furthermore, due to the light blocking sheet 431 is disposed on an object side of the first lens element 421, the reverse inclined structure 413 can be not contacted with the first lens element 421. In other words, by the arrangement of the light blocking sheet 431, the reverse inclined structure 413 can be not contacted with the imaging lens assembly. In detail, the light blocking sheet 431 has an object-side surface (reference number is omitted) faced to an object side and an image-side surface (reference number is omitted) faced to the image side, wherein the object-side surface of the light blocking sheet 431 is contacted with the assembling surface 414, and the image-side surface of the light blocking sheet 431 is contacted with the imaging lens assembly (that is, the image-side surface of the light blocking sheet 431 is contacted with the first lens element 421). When a non-imaging light with large angle is incident into the imaging lens module 400, the non-imaging light with large angle will be reflected to the light blocking sheet 431 by the reverse inclined surface 4131 of the plastic barrel 410 so as to avoid the generation of the stray light and then affecting the image quality.

The plastic barrel 410 is made of a black plastic material and formed by an injection molding method, and the plastic barrel 410 includes at least two injection traces 416. In detail, in the 4th embodiment, a number of the injection traces 416 is two.

According to FIG. 4A and FIG. 4B, a central distance between the valley point 4132 and the concave end 4133 disposed on the image side thereof is a1, a central distance between the two concave ends 4133 is a2, a diameter of the object-side opening 412 is ψ, an angle between the reverse inclined structure 413 and the central axis X is θ, a number of the annular concave structures 413a is N, a central distance between the light blocking sheet 431 and the object-side opening 412 is L, and a focal length of the imaging lens assembly is f. Furthermore, in the one of the annular concave structures 413a which is closest to the object-side opening 412, a distance between the valley point 4132 thereof and the central axis X is D, a distance between the concave end 4133 disposed on the image side of the valley point 4132 thereof and the central axis X is d, and an elastic drafting ratio defined by D and d is EDR (EDR= [(D−d)/D]×100%). The aforementioned parameters can satisfy the following conditions listed in Table 4.

TABLE 4

| 4th Embodiment | | | |
|---|---|---|---|
| a1 (mm) | 0.044 | f (mm) | 3.78 |
| a2 (mm) | 0.130 | f/ψ | 2.054 |
| a1/a2 | 0.338 | D (mm) | 0.992 |
| ψ (mm) | 1.840 | d (mm) | 0.955 |
| θ (degrees) | 15 | EDR (%) | 3.7 |
| N | 5 | L (mm) | 0.7 |

5th Embodiment

Figure 5A:
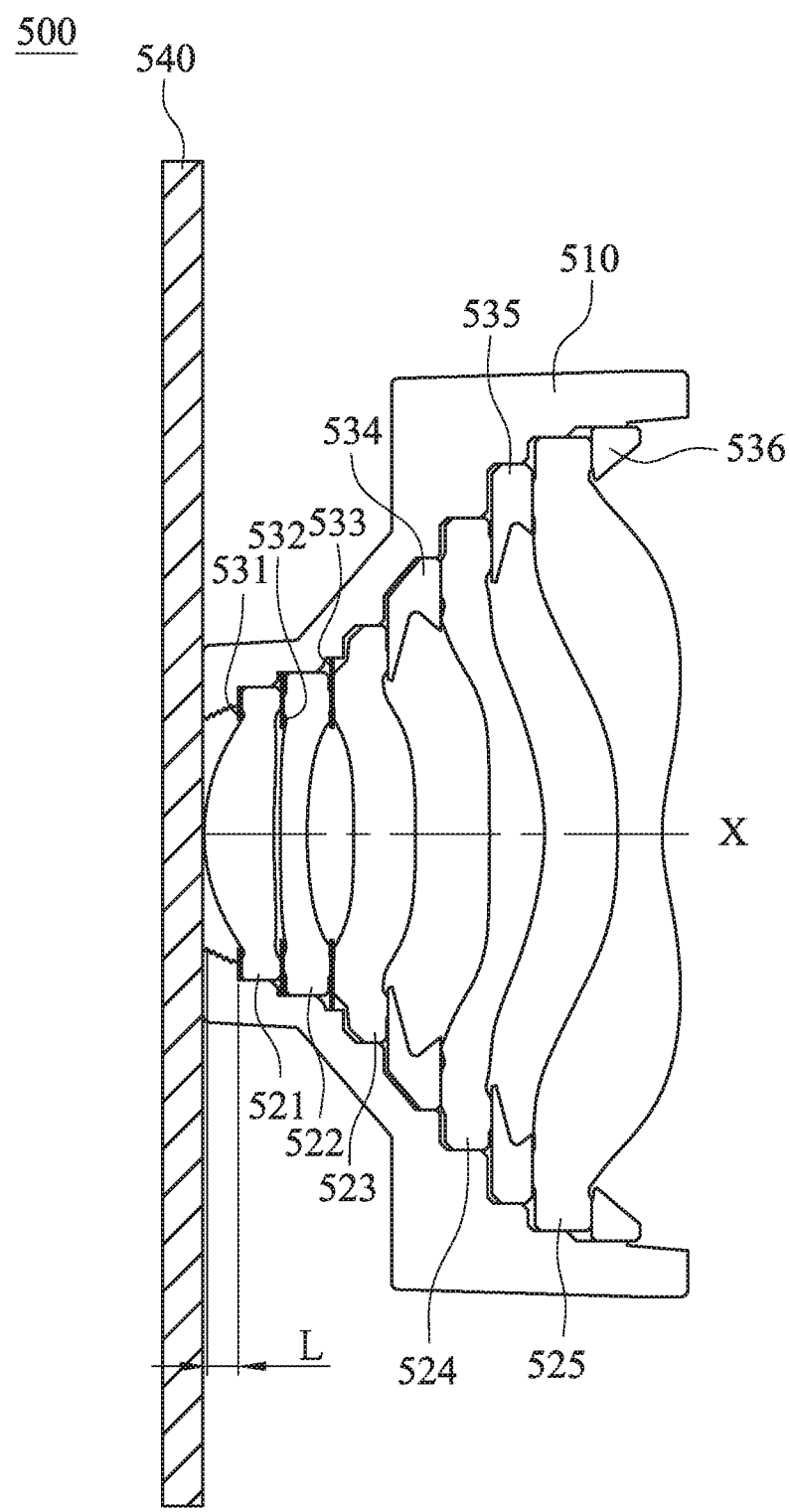
FIG. 5A is a schematic view of an imaging lens module according to the 5th embodiment of the present disclosure.

FIG. 5A is a schematic view of an imaging lens module 500 according to the 5th embodiment of the present disclosure. As shown in FIG. 5A, the imaging lens module 500 has a central axis X and includes a transparent plate 540, a plastic barrel 510, a plurality of light blocking elements (reference number are omitted) and an imaging lens assembly (reference number is omitted). The transparent plate 540 is disposed on an object side of the plastic barrel 510, the transparent plate 540 can be a plate with a display function, and light blocking elements and the imaging lens assembly are disposed in the plastic barrel 510.

Figure 5B:
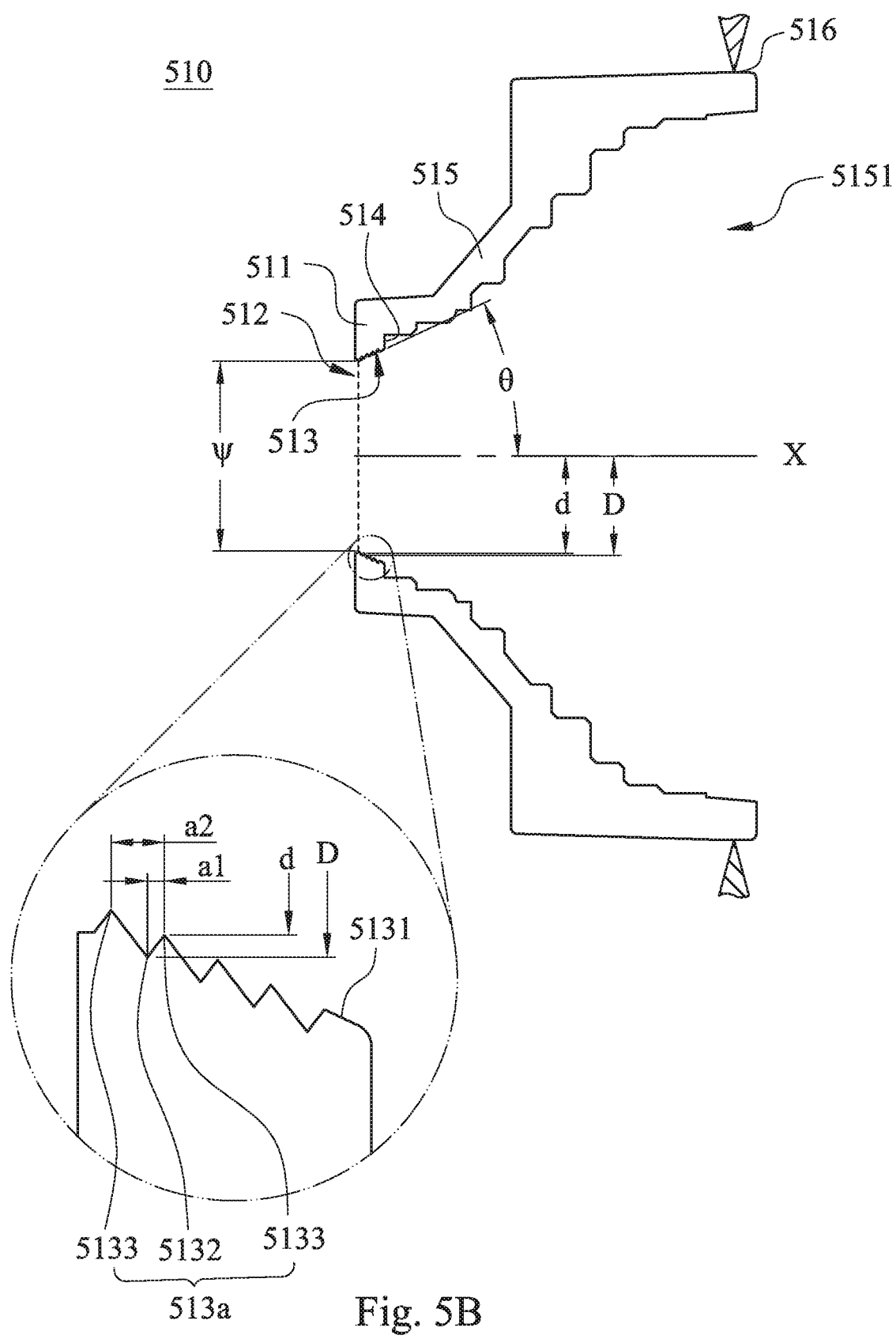
FIG. 5B is a schematic view of a plastic barrel according to the 5th embodiment of FIG. 5A.

FIG. 5B is a schematic view of the plastic barrel 510 according to the 5th embodiment of FIG. 5A. As shown in FIG. 5B, the plastic barrel 510 surrounds the central axis X and includes an object-side portion 511 and a tubular portion 515, wherein the tubular portion 515 is connected to the object-side portion 511 and extends to the image side and then forms a containing space 5151. The object-side portion 511 includes an object-side opening 512, a reverse inclined structure 513 and an assembling surface 514, wherein the object-side opening 512 is a smallest opening of the plastic barrel 510, the reverse inclined structure 513 surrounds the object-side opening 512, and the assembling surface 514 surrounds the reverse inclined structure 513 and is faced to the image side. In the 5th embodiment, the object-side opening 512 is an aperture stop of the imaging lens module 500.

The reverse inclined structure 513 includes a reverse inclined surface 5131 and at least one annular concave structure 513a. In detail, in the 5th embodiment, a number of the annular concave structure 513a is four. The reverse inclined surface 5131 gradually expands from the object-side opening 512 toward an image side, and the annular concave structures 513a are disposed on an object side of the reverse inclined surface 5131 and are recessed from the object-side opening 512 along a direction away from the central axis X. A sectional surface of each of the annular concave structures 513a passing through the central axis X includes a valley point 5132 and two concave ends 5133, the two concave ends 5133 are disposed on an object side and an image side of the valley point 5132, respectively, and the valley point 5132 is located on a position farthest from the central axis X on the annular concave structures 513a. In the two concave ends 5133, the concave end 5133 disposed on the image side of the valley point 5132 is farther from the central axis X than the concave end 5133 disposed on the object side of the valley point 5132. Furthermore, the annular concave structures 513a have a matte surface.

As shown in FIG. 5A, the imaging lens assembly and the light blocking elements are disposed in the containing space 5151 of the tubular portion 515, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 5th embodiment, the imaging lens assembly includes five lens elements being, in order from an object side to an image side, a first lens element 521, a second lens element 522, a third lens element 523, a fourth lens element 524 and a fifth lens element 525. Furthermore, in the 5th embodiment, the light blocking elements are, in order from the object side to the image side, a light blocking sheet 531, a light blocking sheet 532, a light blocking sheet 533, a spacer 534, a spacer 535 and a retainer 536.

Figure 5C:
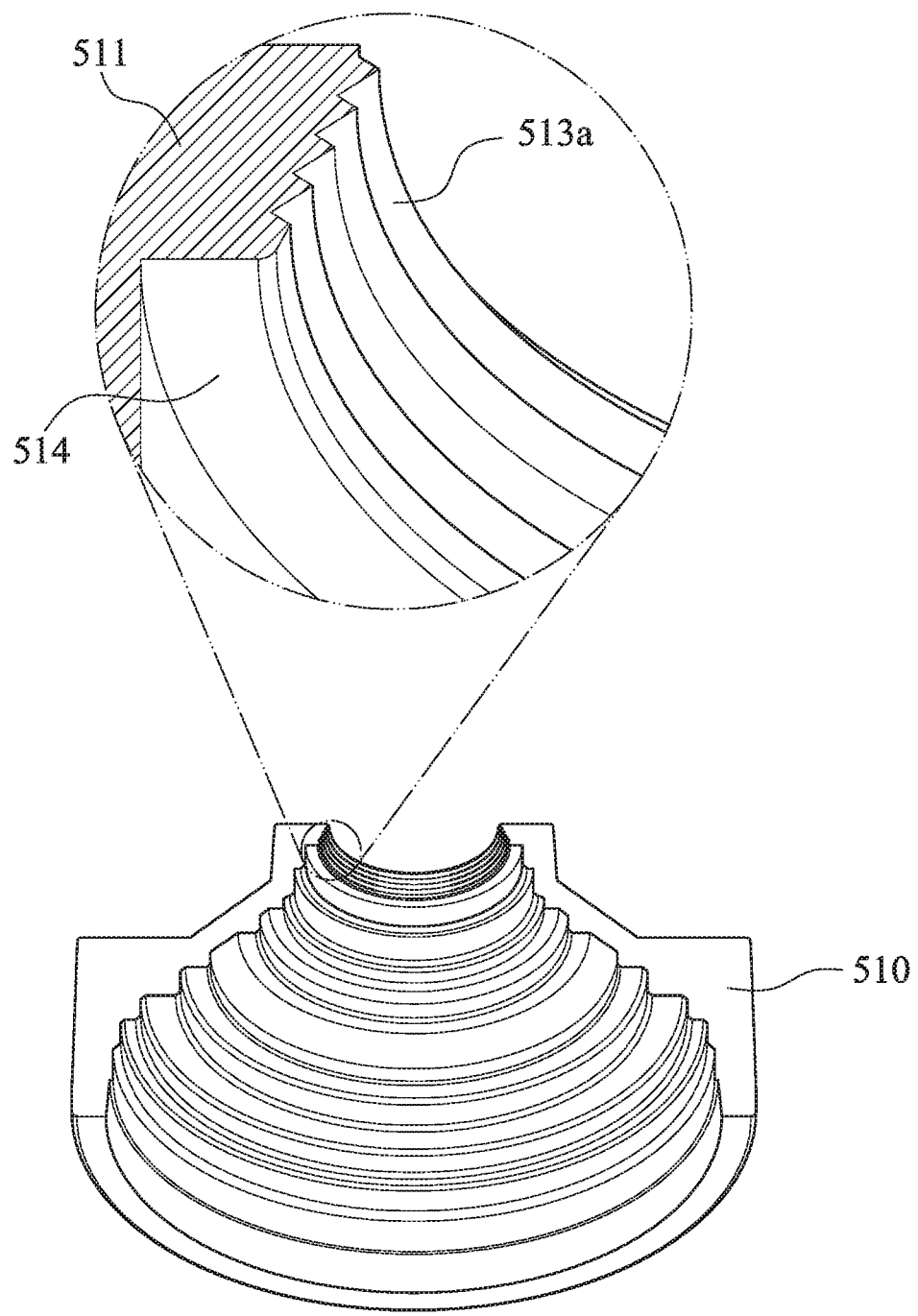
FIG. 5C is a cross-sectional view of the plastic barrel according to the 5th embodiment of FIG. 5A.

FIG. 5C is a cross-sectional view of the plastic barrel 510 according to the 5th embodiment of FIG. 5A. The assembling surface 514 surrounds the reverse inclined surface 5131 and is faced to the image side, the light blocking sheet 531 is connected to the assembling surface 514 and has a hole (reference number is omitted), and the hole is corresponding to the object-side opening 512. Furthermore, due to the light blocking sheet 531 is disposed on an object side of the first lens element 521, the reverse inclined structure 513 can be not contacted with the first lens element 521. In other words, by the arrangement of the light blocking sheet 531, the reverse inclined structure 513 can be not contacted with the imaging lens assembly. In detail, the light blocking sheet 531 has an object-side surface (reference number is omitted) faced to an object side and an image-side surface (reference number is omitted) faced to the image side, wherein the object-side surface of the light blocking sheet 531 is contacted with the assembling surface 514, and the image-side surface of the light blocking sheet 531 is contacted with the imaging lens assembly (that is, the image-side surface of the light blocking sheet 531 is contacted with the first lens element 521). When a non-imaging light with large angle is incident into the imaging lens module 500, the non-imaging light with large angle will be reflected to the light blocking sheet 531 by the reverse inclined surface 5131 of the plastic barrel 510 so as to avoid the generation of the stray light and then affecting the image quality.

The plastic barrel 510 is made of a black plastic material and formed by an injection molding method, and the plastic barrel 510 includes at least two injection traces 516. In detail, in the 5th embodiment, a number of the injection traces 516 is two.

According to FIG. 5A and FIG. 5B, a central distance between the valley point 5132 and the concave end 5133 disposed on the image side thereof is a1, a central distance between the two concave ends 5133 is a2, a diameter of the object-side opening 512 is ψ, an angle between the reverse inclined structure 513 and the central axis X is θ, a number of the annular concave structures 513a is N, a central distance between the light blocking sheet 531 and the object-side opening 512 is L, and a focal length of the imaging lens assembly is f. Furthermore, in the one of the annular concave structures 513a which is closest to the object-side opening 512, a distance between the valley point 5132 thereof and the central axis X is D, a distance between the concave end 5133 disposed on the image side of the valley point 5132 thereof and the central axis X is d, and an elastic drafting ratio defined by D and d is EDR (EDR= [(D−d)/D]×100%). The aforementioned parameters can satisfy the following conditions listed in Table 5.

TABLE 5

5th Embodiment

| | | | |
|---|---|---|---|
| a1 (mm) | 0.015 | f (mm) | 3.74 |
| a2 (mm) | 0.048 | f/ψ | 2.2 |
| a1/a2 | 0.3125 | D (mm) | 0.892 |
| ψ (mm) | 1.700 | d (mm) | 0.872 |
| θ (degrees) | 25 | EDR (%) | 2.2 |
| N | 4 | L (mm) | 0.233 |

6th Embodiment

Figure 6A:
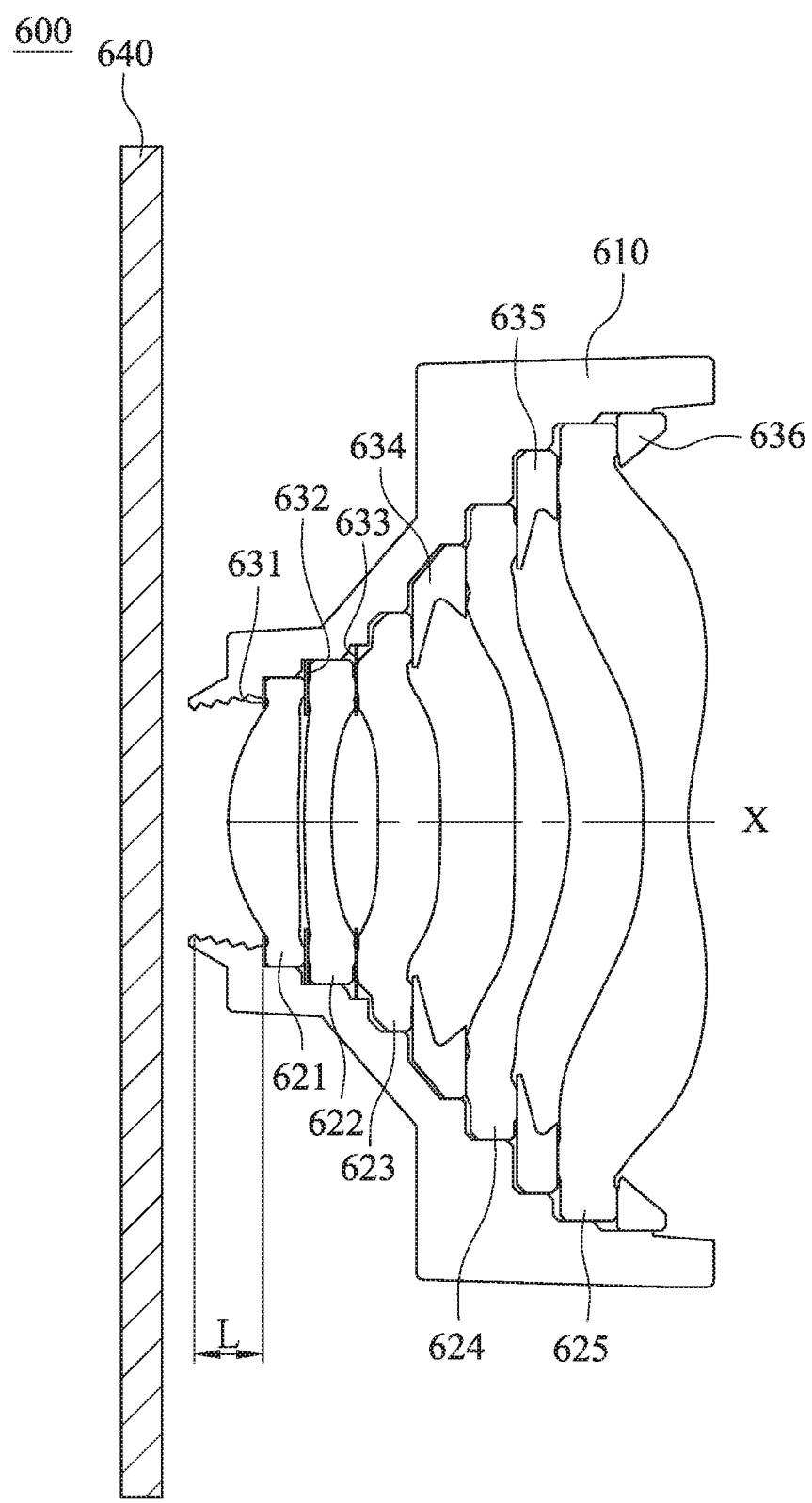
FIG. 6A is a schematic view of an imaging lens module according to the 6th embodiment of the present disclosure.

FIG. 6A is a schematic view of an imaging lens module 600 according to the 6th embodiment of the present disclosure. As shown in FIG. 6A, the imaging lens module 600 has a central axis X and includes a transparent plate 640, a plastic barrel 610, a plurality of light blocking elements (reference number are omitted) and an imaging lens assembly (reference number is omitted). The transparent plate 640 is disposed on an object side of the plastic barrel 610, the transparent plate 640 can be a plate with a display function, and light blocking elements and the imaging lens assembly are disposed in the plastic barrel 610.

Figure 6B:
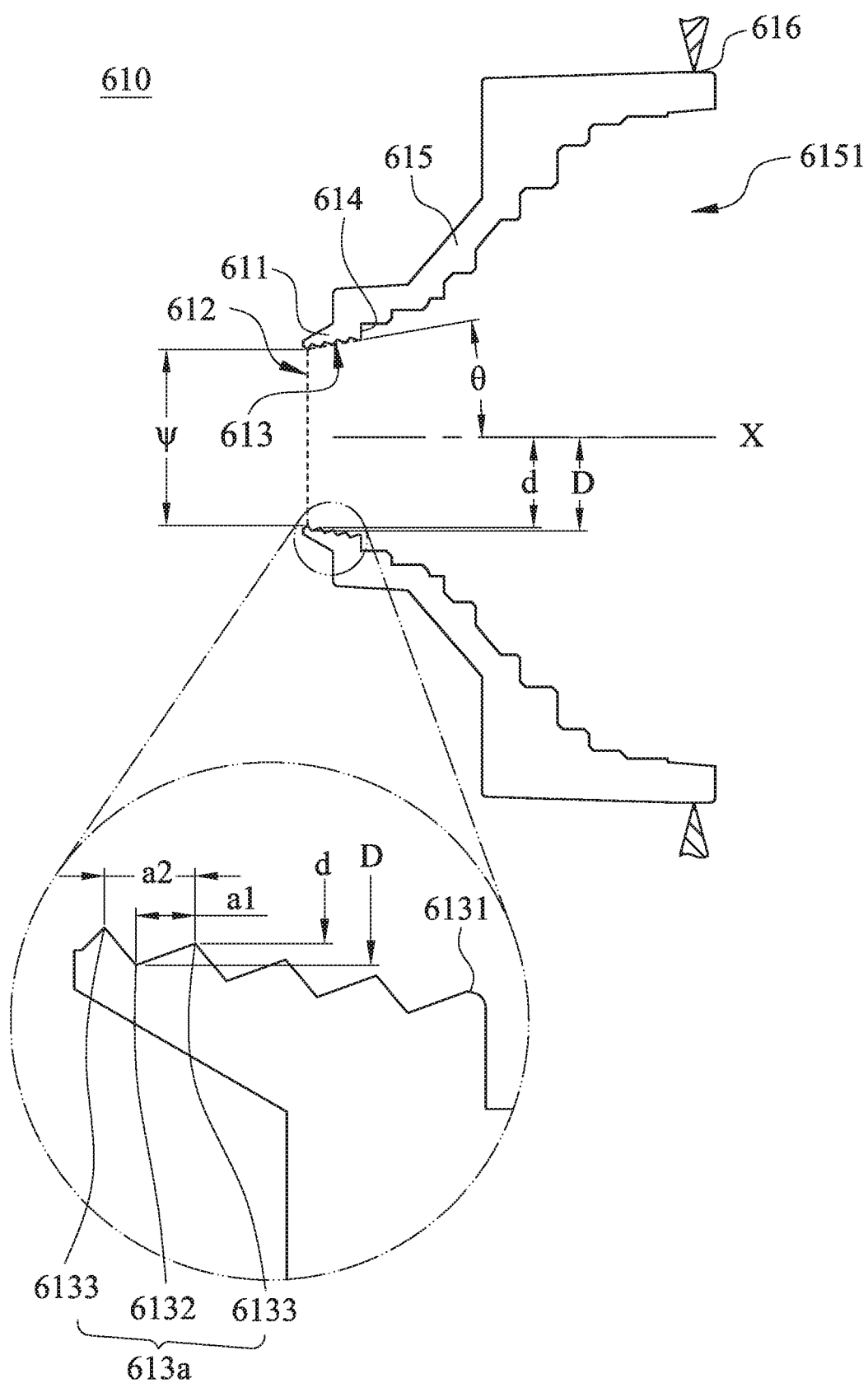
FIG. 6B is a schematic view of a plastic barrel according to the 6th embodiment of FIG. 6A.

FIG. 6B is a schematic view of the plastic barrel 610 according to the 6th embodiment of FIG. 6A. As shown in FIG. 6B, the plastic barrel 610 surrounds the central axis X and includes an object-side portion 611 and a tubular portion 615, wherein the tubular portion 615 is connected to the object-side portion 611 and extends to the image side and then forms a containing space 6151. The object-side portion 611 includes an object-side opening 612, a reverse inclined structure 613 and an assembling surface 614, wherein the object-side opening 612 is a smallest opening of the plastic barrel 610, the reverse inclined structure 613 surrounds the object-side opening 612, and the assembling surface 614 surrounds the reverse inclined structure 613 and is faced to the image side. In the 6th embodiment, the object-side opening 612 is an aperture stop of the imaging lens module 600.

The reverse inclined structure 613 includes a reverse inclined surface 6131 and at least one annular concave structure 613a. In detail, in the 6th embodiment, a number of the annular concave structure 613a is four. The reverse inclined surface 6131 gradually expands from the object-side opening 612 toward an image side, and the annular concave structures 613a are disposed on an object side of the reverse inclined surface 6131 and are recessed from the object-side opening 612 along a direction away from the central axis X. A sectional surface of each of the annular concave structures 613a passing through the central axis X includes a valley point 6132 and two concave ends 6133, the two concave ends 6133 are disposed on an object side and an image side of the valley point 6132, respectively, and the valley point 6132 is located on a position farthest from the central axis X on the annular concave structures 613a. In the two concave ends 6133, the concave end 6133 disposed on the image side of the valley point 6132 is farther from the central axis X than the concave end 6133 disposed on the object side of the valley point 6132. Furthermore, the annular concave structures 613a have a matte surface.

As shown in FIG. 6A, the imaging lens assembly and the light blocking elements are disposed in the containing space 6151 of the tubular portion 615, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 6th embodiment, the imaging lens assembly includes five lens elements being, in order from an object side to an image side, a first lens element 621, a second lens element 622, a third lens element 623, a fourth lens element 624 and a fifth lens element 625. Furthermore, in the 6th embodiment, the light blocking elements are, in order from the object side to the image side, a light blocking sheet 631, a light blocking sheet 632, a light blocking sheet 633, a spacer 634, a spacer 635 and a retainer 636.

Figure 6C:
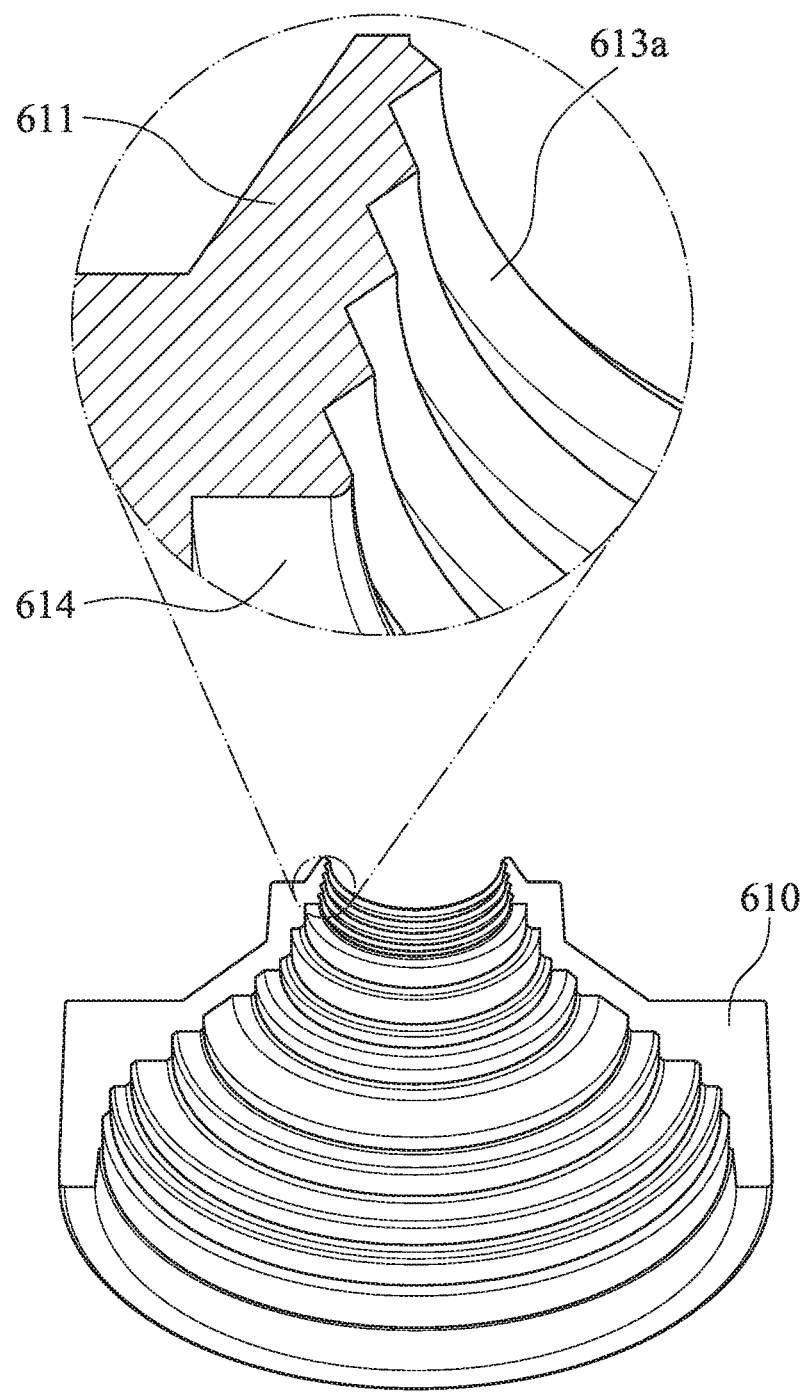
FIG. 6C is a cross-sectional view of the plastic barrel according to the 6th embodiment of FIG. 6A.

FIG. 6C is a cross-sectional view of the plastic barrel 610 according to the 6th embodiment of FIG. 6A. The assembling surface 614 surrounds the reverse inclined surface 6131 and is faced to the image side, the light blocking sheet 631 is connected to the assembling surface 614 and has a hole (reference number is omitted), and the hole is corresponding to the object-side opening 612. Furthermore, due to the light blocking sheet 631 is disposed on an object side of the first lens element 621, the reverse inclined structure 613 can be not contacted with the first lens element 621. In other words, by the arrangement of the light blocking sheet 631, the reverse inclined structure 613 can be not contacted with the imaging lens assembly. In detail, the light blocking sheet 631 has an object-side surface (reference number is omitted) faced to an object side and an image-side surface (reference number is omitted) faced to the image side, wherein the object-side surface of the light blocking sheet 631 is contacted with the assembling surface 614, and the image-side surface of the light blocking sheet 631 is contacted with the imaging lens assembly (that is, the image-side surface of the light blocking sheet 631 is contacted with the first lens element 621). When a non-imaging light with large angle is incident into the imaging lens module 600, the non-imaging light with large angle will be reflected to the light blocking sheet 631 by the reverse inclined surface 6131 of the plastic barrel 610 so as to avoid the generation of the stray light and then affecting the image quality.

The plastic barrel 610 is made of a black plastic material and formed by an injection molding method, and the plastic barrel 610 includes at least two injection traces 616. In detail, in the 6th embodiment, a number of the injection traces 616 is two.

According to FIG. 6A and FIG. 6B, a central distance between the valley point 6132 and the concave end 6133 disposed on the image side thereof is a1, a central distance between the two concave ends 6133 is a2, a diameter of the object-side opening 612 is ψ, an angle between the reverse inclined structure 613 and the central axis X is θ, a number of the annular concave structures 613a is N, a central distance between the light blocking sheet 631 and the object-side opening 612 is L, and a focal length of the imaging lens assembly is f. Furthermore, in the one of the annular concave structures 613a which is closest to the object-side opening 612, a distance between the valley point 6132 thereof and the central axis X is D, a distance between the concave end 6133 disposed on the image side of the valley point 6132 thereof and the central axis X is d, and an elastic drafting ratio defined by D and d is EDR (EDR= [(D−d)/D]×100%). The aforementioned parameters can satisfy the following conditions listed in Table 6.

TABLE 6

6th Embodiment

| a1 (mm) | 0.078 | f (mm) | 3.74 |
|---|---|---|---|
| a2 (mm) | 0.120 | f/ψ | 2.253 |
| a1/a2 | 0.65 | D (mm) | 0.880 |
| ψ (mm) | 1.660 | d (mm) | 0.851 |
| θ (degrees) | 10 | EDR (%) | 3.3 |
| N | 4 | L (mm) | 0.505 |

7th Embodiment

Figure 7A:
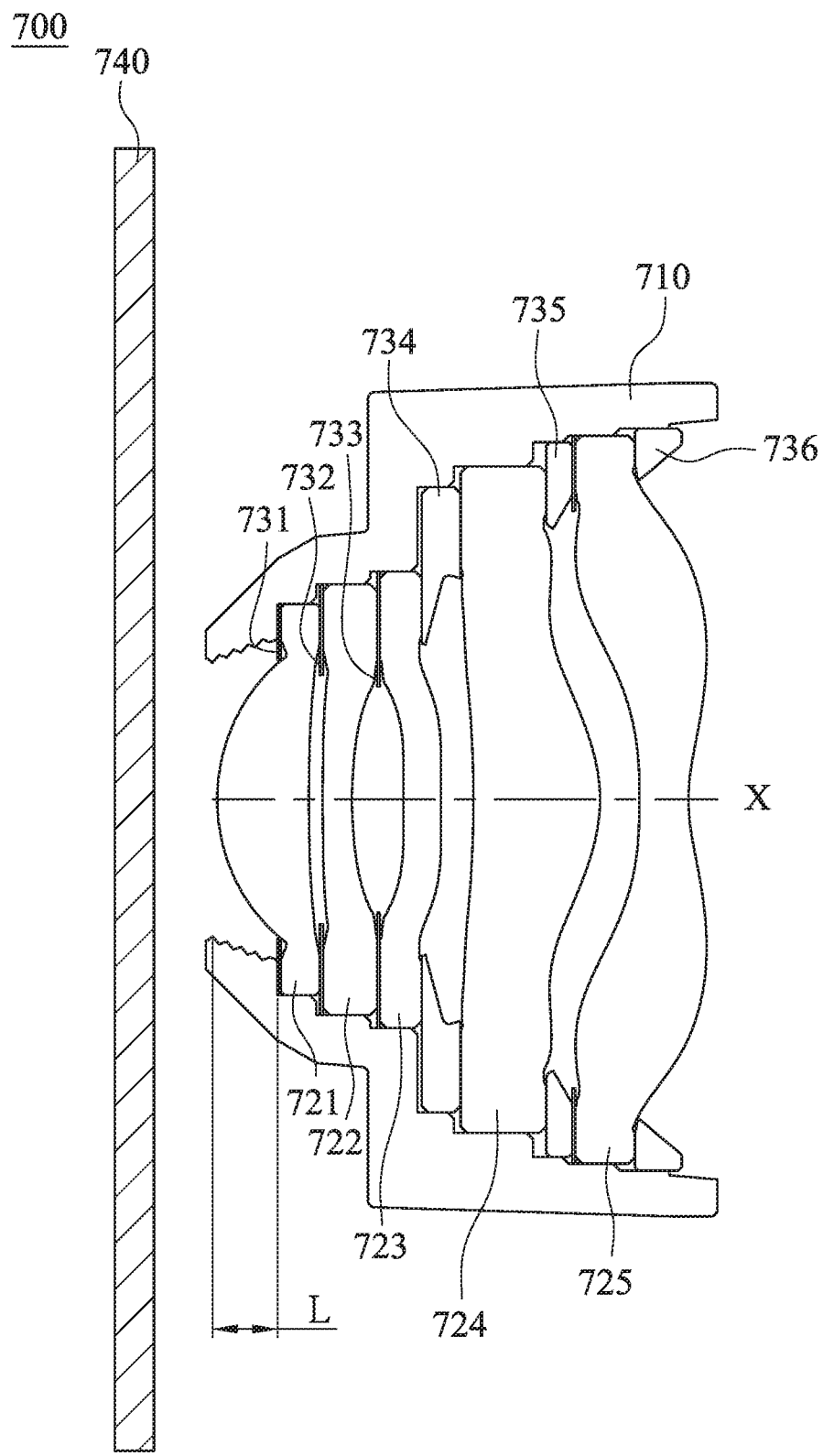
FIG. 7A is a schematic view of an imaging lens module according to the 7th embodiment of the present disclosure.

FIG. 7A is a schematic view of an imaging lens module 700 according to the 7th embodiment of the present disclosure. As shown in FIG. 7A, the imaging lens module 700 has a central axis X and includes a transparent plate 740, a plastic barrel 710, a plurality of light blocking elements (reference number are omitted) and an imaging lens assembly (reference number is omitted). The transparent plate 740 is disposed on an object side of the plastic barrel 710, the transparent plate 740 can be a plate with a display function, and light blocking elements and the imaging lens assembly are disposed in the plastic barrel 710.

Figure 7B:
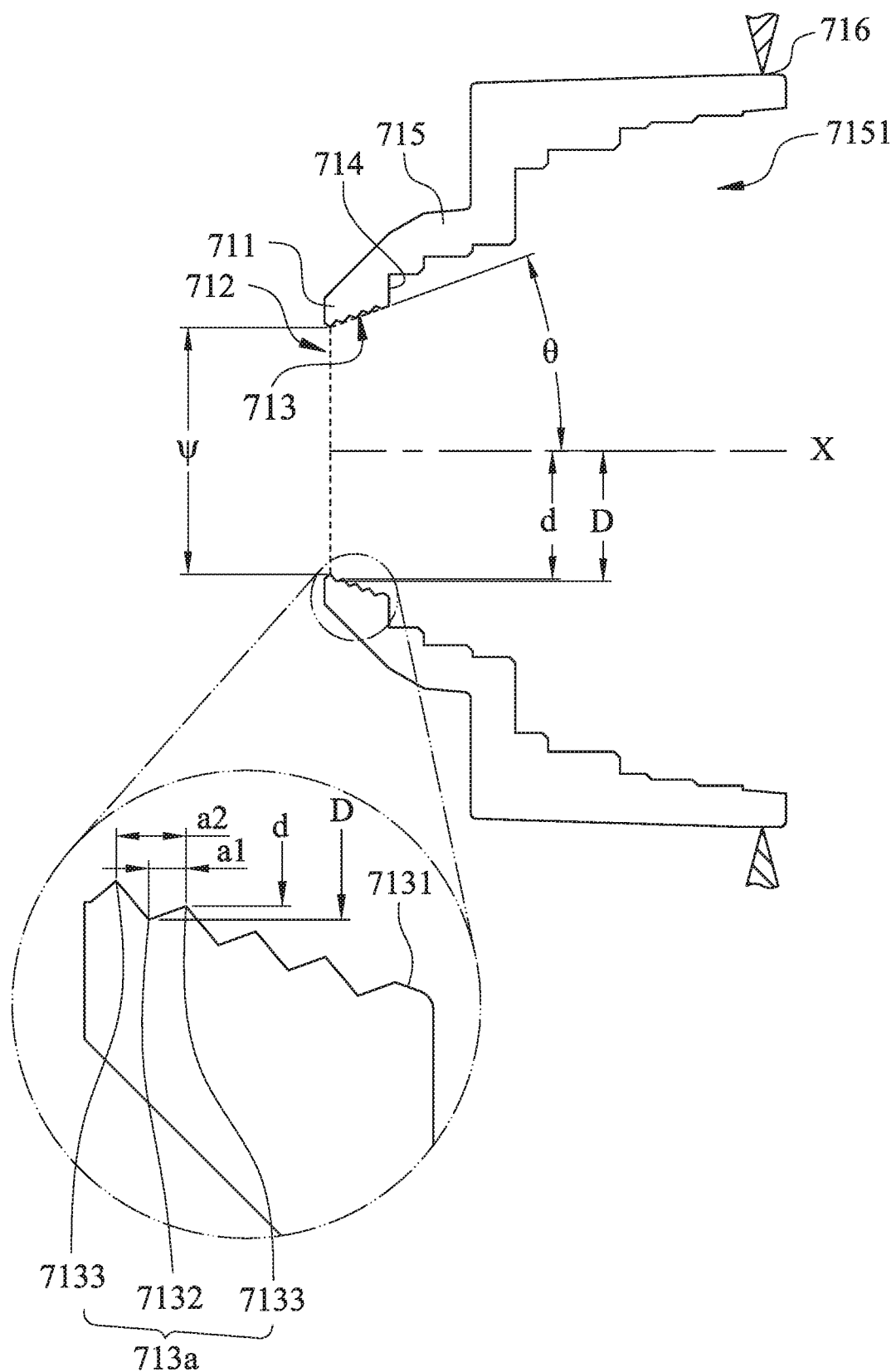
FIG. 7B is a schematic view of a plastic barrel according to the 7th embodiment of FIG. A.

FIG. 7B is a schematic view of the plastic barrel 710 according to the 7th embodiment of FIG. A. As shown in FIG. 7B, the plastic barrel 710 surrounds the central axis X and includes an object-side portion 711 and a tubular portion 715, wherein the tubular portion 715 is connected to the object-side portion 711 and extends to the image side and then forms a containing space 7151. The object-side portion 711 includes an object-side opening 712, a reverse inclined structure 713 and an assembling surface 714, wherein the object-side opening 712 is a smallest opening of the plastic barrel 710, the reverse inclined structure 713 surrounds the object-side opening 712, and the assembling surface 714 surrounds the reverse inclined structure 713 and is faced to the image side. In the 7th embodiment, the object-side opening 712 is an aperture stop of the imaging lens module 700.

The reverse inclined structure 713 includes a reverse inclined surface 7131 and at least one annular concave structure 713a. In detail, in the 7th embodiment, a number of the annular concave structure 713a is four. The reverse inclined surface 7131 gradually expands from the object-side opening 712 toward an image side, and the annular concave structures 713a are disposed on an object side of the reverse inclined surface 7131 and are recessed from the object-side opening 712 along a direction away from the central axis X. A sectional surface of each of the annular concave structures 713a passing through the central axis X includes a valley point 7132 and two concave ends 7133, the two concave ends 7133 are disposed on an object side and an image side of the valley point 7132, respectively, and the valley point 7132 is located on a position farthest from the central axis X on the annular concave structures 713a. In the two concave ends 7133, the concave end 7133 disposed on the image side of the valley point 7132 is farther from the central axis X than the concave end 7133 disposed on the object side of the valley point 7132. Furthermore, the annular concave structures 713a have a matte surface.

As shown in FIG. 7A, the imaging lens assembly and the light blocking elements are disposed in the containing space 7151 of the tubular portion 715, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 7th embodiment, the imaging lens assembly includes five lens elements being, in order from an object side to an image side, a first lens element 721, a second lens element 722, a third lens element 723, a fourth lens element 724 and a fifth lens element 725. Furthermore, in the 7th embodiment, the light blocking elements are, in order from the object side to the image side, a light blocking sheet 731, a light blocking sheet 732, a light blocking sheet 733, a spacer 734, a spacer 735 and a retainer 736.

The assembling surface 714 surrounds the reverse inclined surface 7131 and is faced to the image side, the light blocking sheet 731 is connected to the assembling surface 714 and has a hole (reference number is omitted), and the hole is corresponding to the object-side opening 712. Furthermore, due to the light blocking sheet 731 is disposed on an object side of the first lens element 721, the reverse inclined structure 713 can be not contacted with the first lens element 721. In other words, by the arrangement of the light blocking sheet 731, the reverse inclined structure 713 can be not contacted with the imaging lens assembly. In detail, the light blocking sheet 731 has an object-side surface (reference number is omitted) faced to an object side and an image-side surface (reference number is omitted) faced to the image side, wherein the object-side surface of the light blocking sheet 731 is contacted with the assembling surface 714, and the image-side surface of the light blocking sheet 731 is contacted with the imaging lens assembly (that is, the image-side surface of the light blocking sheet 731 is contacted with the first lens element 721). When a non-imaging light with large angle is incident into the imaging lens module 700, the non-imaging light with large angle will be reflected to the light blocking sheet 731 by the reverse inclined surface 7131 of the plastic barrel 710 so as to avoid the generation of the stray light and then affecting the image quality.

The plastic barrel 710 is made of a black plastic material and formed by an injection molding method, and the plastic barrel 710 includes at least two injection traces 716. In detail, in the 7th embodiment, a number of the injection traces 716 is two.

According to FIG. 7A and FIG. 7B, a central distance between the valley point 7132 and the concave end 7133 disposed on the image side thereof is a1, a central distance between the two concave ends 7133 is a2, a diameter of the object-side opening 712 is ψ, an angle between the reverse inclined structure 713 and the central axis X is θ, a number of the annular concave structures 713a is N, a central distance between the light blocking sheet 731 and the object-side opening 712 is L, and a focal length of the imaging lens assembly is f. Furthermore, in the one of the annular concave structures 713a which is closest to the object-side opening 712, a distance between the valley point 7132 thereof and the central axis X is D, a distance between the concave end 7133 disposed on the image side of the valley point 7132 thereof and the central axis X is d, and an elastic drafting ratio defined by D and d is EDR (EDR= [(D−d)/D]×100%). The aforementioned parameters can satisfy the following conditions listed in Table 7.

TABLE 7

7th Embodiment

| a1 (mm) | 0.059 | f (mm) | 4.03 |
|---|---|---|---|
| a2 (mm) | 0.110 | f/ψ | 1.919 |
| a1/a2 | 0.536 | D (mm) | 1.111 |
| ψ (mm) | 2.100 | d (mm) | 1.090 |
| θ (degrees) | 20 | EDR (%) | 1.9 |
| N | 4 | L (mm) | 0.500 |

8th Embodiment

Figure 8A:
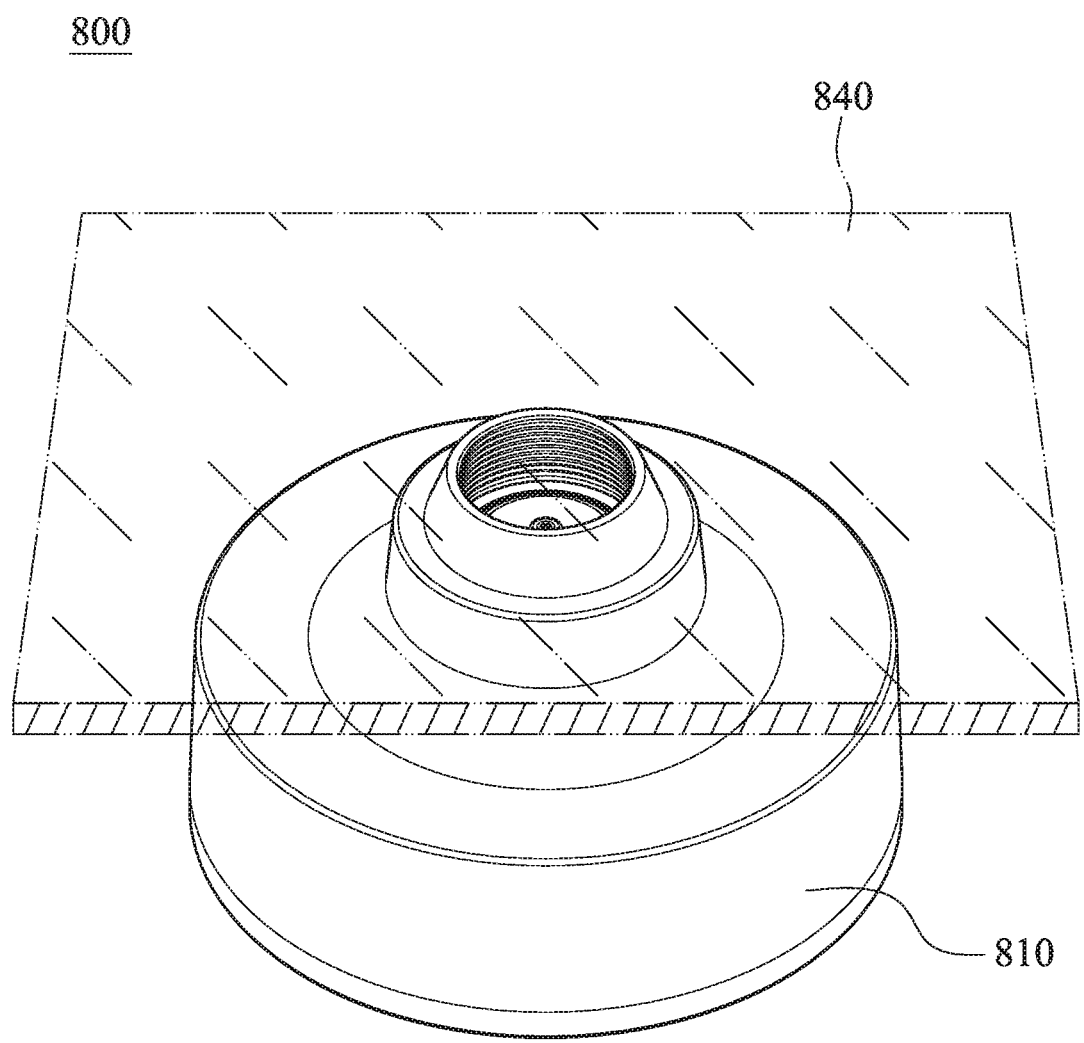
FIG. 8A is a three dimensional schematic view of an appearance of an imaging lens module according to the 8th embodiment of the present disclosure.
Figure 8B:
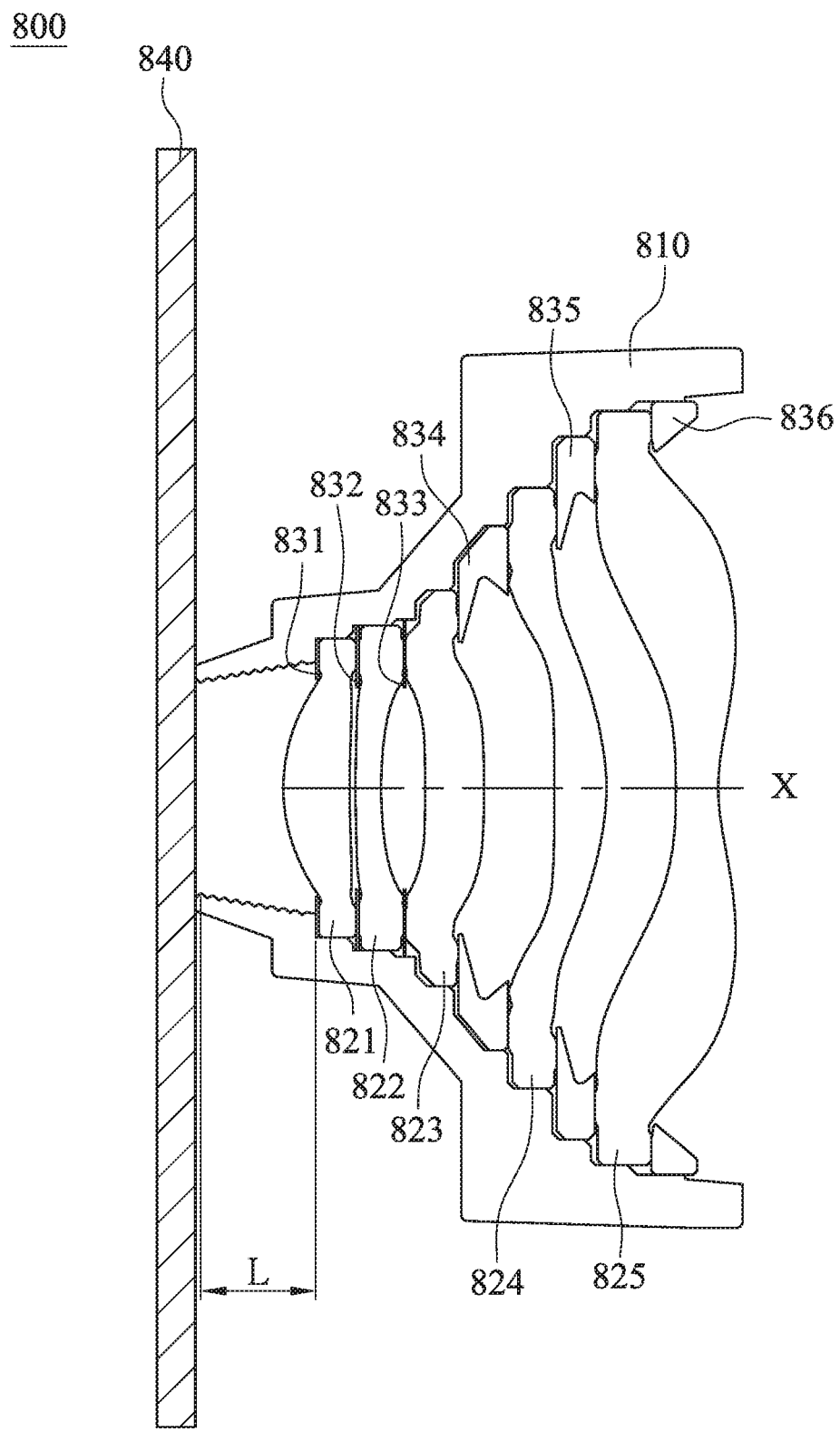
FIG. 8B is a schematic view of the imaging lens module according to the 8th embodiment of FIG. 8A.

FIG. 8A is a three dimensional schematic view of an appearance of an imaging lens module 800 according to the 8th embodiment of the present disclosure. FIG. 8B is a schematic view of the imaging lens module 800 according to the 8th embodiment of FIG. 8A. As shown in FIG. 8A and FIG. 8B, the imaging lens module 800 has a central axis X and includes a transparent plate 840, a plastic barrel 810, a plurality of light blocking elements (reference number are omitted) and an imaging lens assembly (reference number is omitted). The transparent plate 840 is disposed on the object side of the plastic barrel 810, the transparent plate 840 can be a plate with a display function, and light blocking elements and the imaging lens assembly are disposed in the plastic barrel 810.

Figure 8C:
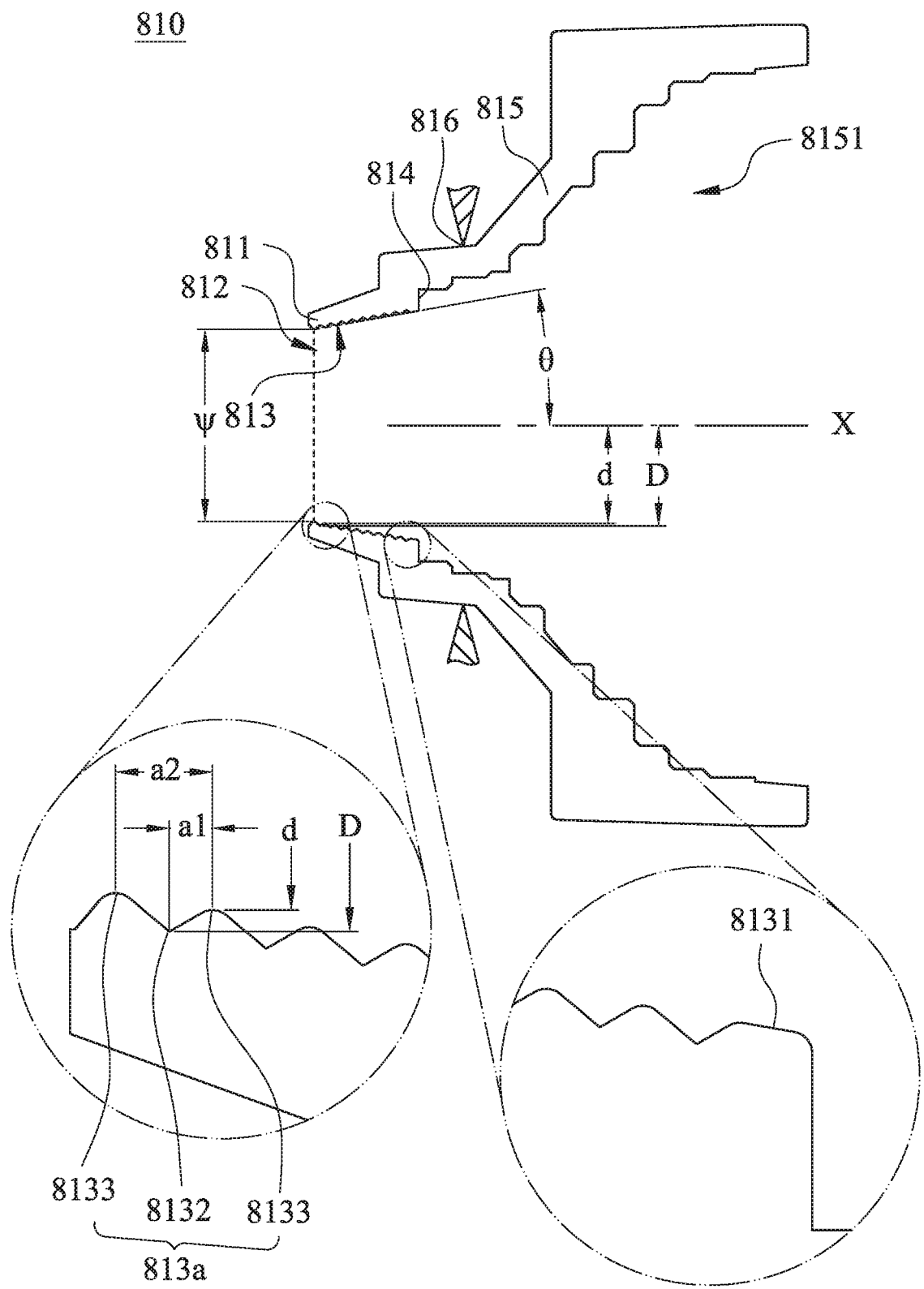
FIG. 8C is a schematic view of a plastic barrel according to the 8th embodiment of FIG. 8A.

FIG. 8C is a schematic view of the plastic barrel 810 according to the 8th embodiment of FIG. 8A. As shown in FIG. 8C, the plastic barrel 810 surrounds the central axis X and includes an object-side portion 811 and a tubular portion 815, wherein the tubular portion 815 is connected to the object-side portion 811 and extends to the image side and then forms a containing space 8151. The object-side portion 811 includes an object-side opening 812, a reverse inclined structure 813 and an assembling surface 814, wherein the object-side opening 812 is a smallest opening of the plastic barrel 810, the reverse inclined structure 813 surrounds the object-side opening 812, and the assembling surface 814 surrounds the reverse inclined structure 813 and is faced to the image side. In the 8th embodiment, the object-side opening 812 is an aperture stop of the imaging lens module 800.

The reverse inclined structure 813 includes a reverse inclined surface 8131 and at least one annular concave structure 813a. In detail, in the 8th embodiment, a number of the annular concave structure 813a is nine. The reverse inclined surface 8131 gradually expands from the object-side opening 812 toward an image side, and the annular concave structures 813a are disposed on object side of the reverse inclined surface 8131 and are recessed from the object-side opening 812 along a direction away from the central axis X. A sectional surface of each of the annular concave structures 813a passing through the central axis X includes a valley point 8132 and two concave ends 8133, the two concave ends 8133 are disposed on an object side and an image side of the valley point 8132, respectively, and the valley point 8132 is located on a position farthest from the central axis X on the annular concave structures 813a. In the two concave ends 8133, the concave end 8133 disposed on the image side of the valley point 8132 is farther from the central axis X than the concave end 8133 disposed on the object side of the valley point 8132. Furthermore, the annular concave structures 813a have a matte surface.

As shown in FIG. 8A, the imaging lens assembly and the light blocking elements are disposed in the containing space 8151 of the tubular portion 815, the imaging lens assembly has an optical axis (reference number is omitted), and the optical axis and the central axis X are coaxial, wherein the imaging lens assembly includes a plurality of lens elements, and a number of the lens elements is more than or equal to four and less than or equal to ten. In detail, in the 8th embodiment, the imaging lens assembly includes five lens elements being, in order from an object side to an image side, a first lens element 821, a second lens element 822, a third lens element 823, a fourth lens element 824 and a fifth lens element 825. Furthermore, in the 8th embodiment, the light blocking elements are, in order from the object side to the image side, a light blocking sheet 831, a light blocking sheet 832, a light blocking sheet 833, a spacer 834, a spacer 835 and a retainer 836.

Figure 8D:
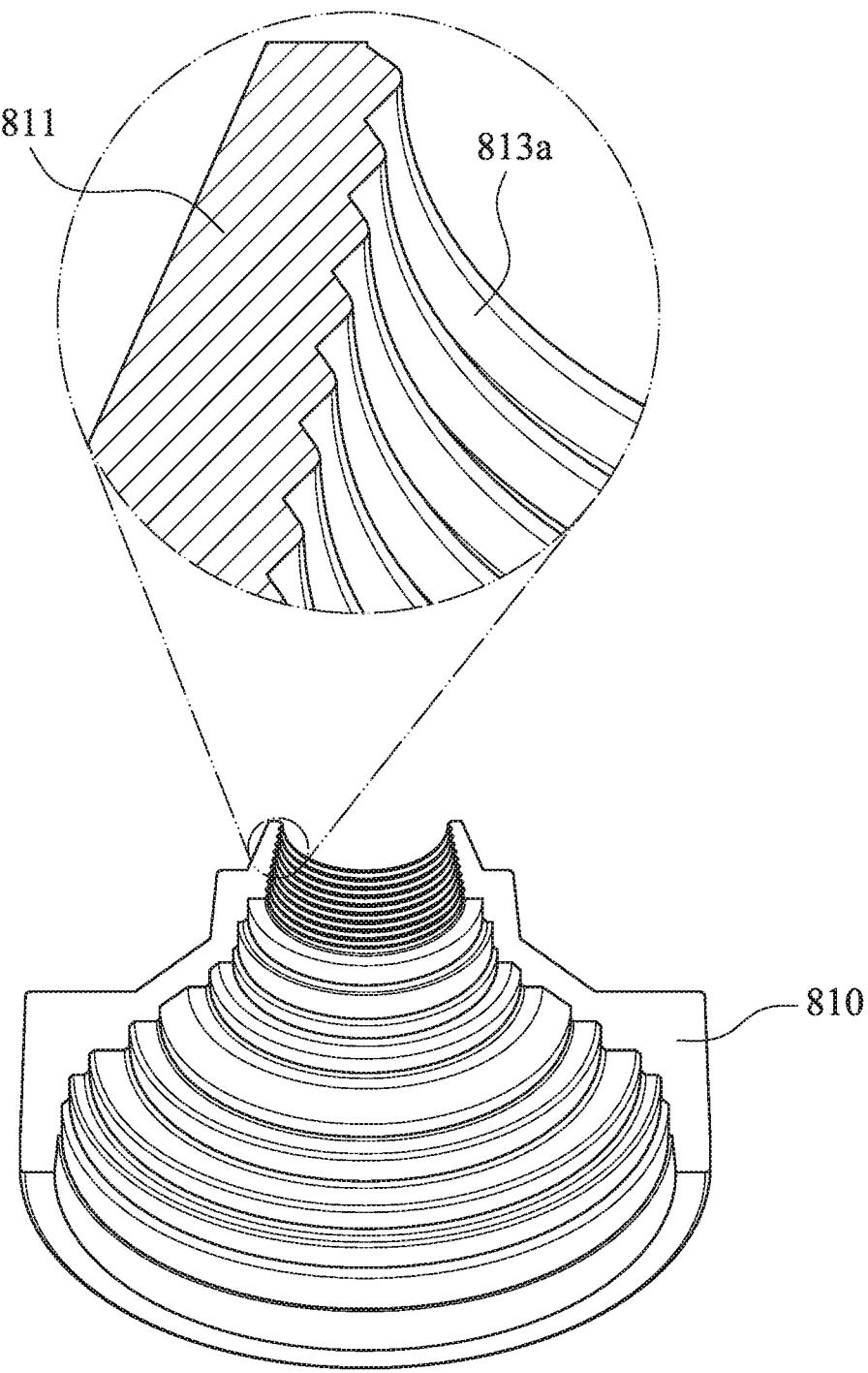
FIG. 8D is a cross-sectional view of the plastic barrel according to the 8th embodiment of FIG. 8A.
Figure 8E:
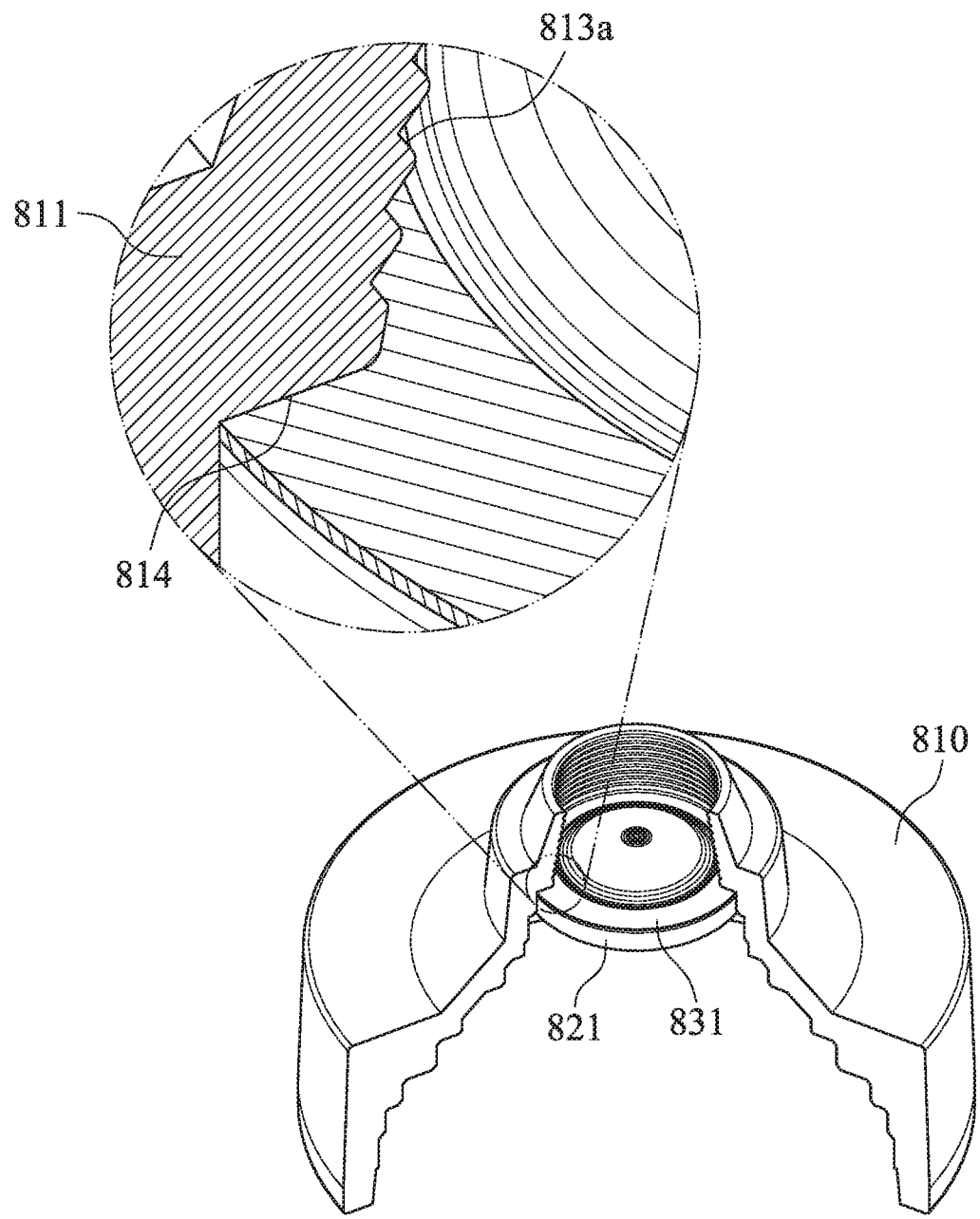
FIG. 8E is a schematic view of the plastic barrel, a first lens element and a light blocking sheet according to the 8th embodiment of FIG. 8A.

FIG. 8D is a cross-sectional view of the plastic barrel 810 according to the 8th embodiment of FIG. 8A. FIG. 8E is a schematic view of the plastic barrel 810, the first lens element 821 and the light blocking sheet 831 according to the 8th embodiment of FIG. 8A. The assembling surface 814 surrounds the reverse inclined surface 8131 and is faced to the image side, the light blocking sheet 831 is connected to the assembling surface 814 and has a hole (reference number is omitted), and the hole is corresponding to the object-side opening 812. Furthermore, due to the light blocking sheet 831 is disposed on an object side of the first lens element 821, the reverse inclined structure 813 can be not contacted with the first lens element 821. In other words, by the arrangement of the light blocking sheet 831, the reverse inclined structure 813 can be not contacted with the imaging lens assembly. In detail, the light blocking sheet 831 has an object-side surface (reference number is omitted) faced to an object side and an image-side surface (reference number is omitted) faced to the image side, wherein the object-side surface of the light blocking sheet 831 is contacted with the assembling surface 814, and the image-side surface of the light blocking sheet 831 is contacted with the imaging lens assembly (that is, the image-side surface of the light blocking sheet 831 is contacted with the first lens element first lens element 821). When a non-imaging light with large angle is incident into the imaging lens module 800, the non-imaging light with large angle will be reflected to the light blocking sheet 831 by the reverse inclined surface 8131 of the plastic barrel 810 so as to avoid the generation of the stray light and then affecting the image quality.

The plastic barrel 810 is made of a black plastic material and formed by an injection molding method, and the plastic barrel 810 includes at least two injection traces 816. In detail, in the 8th embodiment, a number of the injection traces 816 is two.

According to FIG. 8A and FIG. 8B, a central distance between the valley point 8132 and the concave end 8133 disposed on the image side thereof is a1, a central distance between the two concave ends 8133 is a2, a diameter of the object-side opening 812 is ψ, an angle between the reverse inclined structure 813 and the central axis X is θ, a number of the annular concave structures 813a is N, a central distance between the light blocking sheet 831 and the object-side opening 812 is L, and a focal length of the imaging lens assembly is f. Furthermore, in the one of the annular concave structures 813a which is closest to the object-side opening 812, a distance between the valley point 8132 thereof and the central axis X is D, a distance between the concave end 8133 disposed on the image side of the valley point 8132 thereof and the central axis X is d, and an elastic drafting ratio defined by D and d is EDR (EDR= [(D−d)/D]×100%). The aforementioned parameters can satisfy the following conditions listed in Table 8.

TABLE 8

8th embodiment

| a1 (mm) | 0.041 | f (mm) | 3.74 |
|---|---|---|---|
| a2 (mm) | 0.092 | f/ψ | 2.265 |
| a1/a2 | 0.446 | D (mm) | 0.862 |
| ψ (mm) | 1.651 | d (mm) | 0.842 |
| θ (degrees) | 10 | EDR (%) | 2.3 |
| N | 9 | L (mm) | 0.900 |

9th Embodiment

Figure 9A:
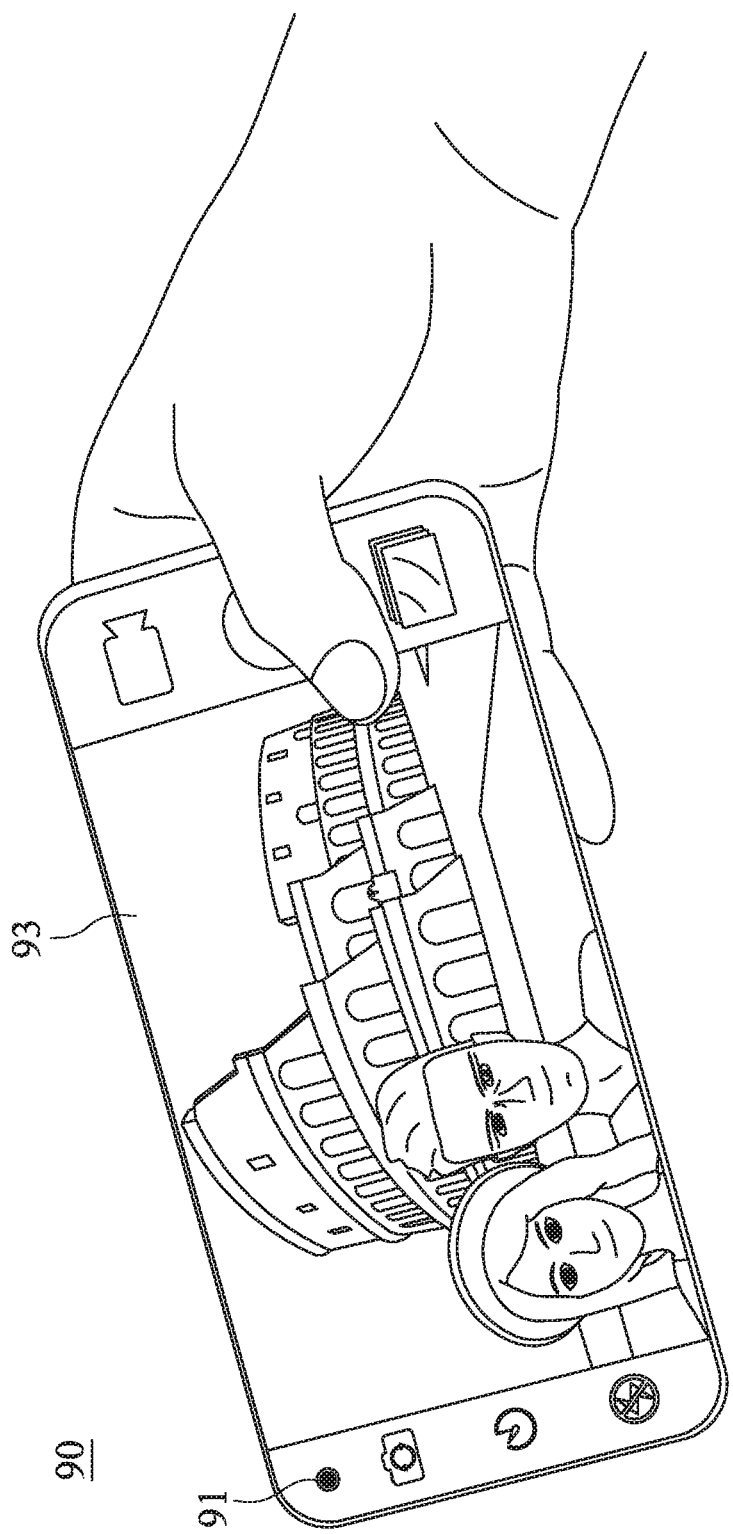
FIG. 9A is a schematic view of an electronic device according to the 9th embodiment of the present disclosure.
Figure 9B:
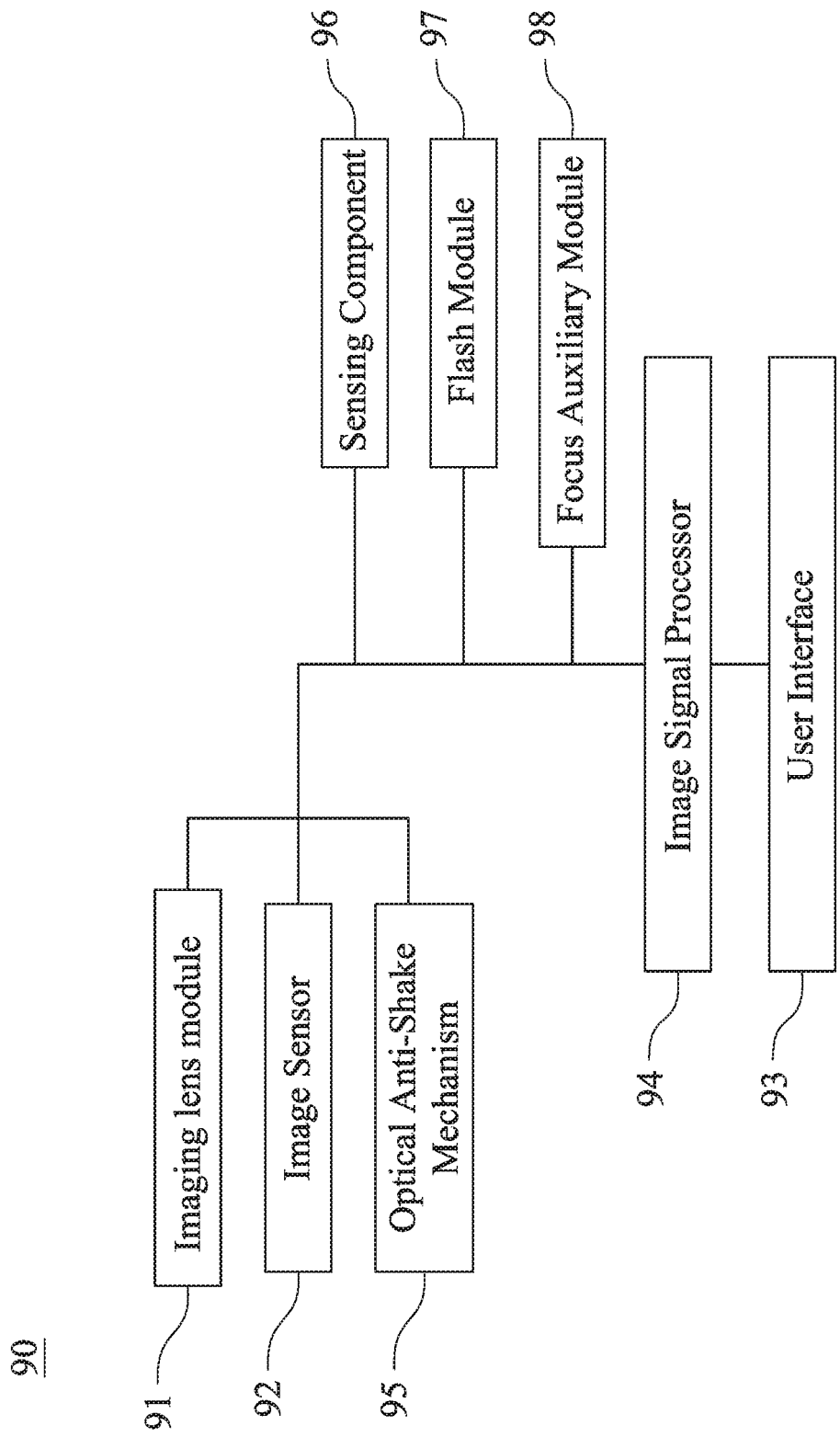
FIG. 9B is a block diagram of the electronic device according to the 9th embodiment of FIG. 9A.

FIG. 9A is a schematic view of an electronic device 90 according to the 9th embodiment of the present disclosure. FIG. 9B is a block diagram of the electronic device 90 of FIG. 9A. As shown in FIG. 9A and FIG. 9B, the electronic device 90 is a smartphone and includes an imaging lens module 91, a user interface 93 and an image sensor 92. In the 9th embodiment, the imaging lens module 91 is disposed on a side region of the user interface 93, and the image sensor 92 is disposed on an image surface (not shown) of the imaging lens module 91, wherein the user interface 93 can be a touch screen or a display screen, and the present disclosure is not limited thereto. The imaging lens module 91 can be any one of the imaging lens module according to the 1st to 8th embodiment, and the imaging lens module 91 includes a plastic barrel (not shown) and an imaging lens assembly (not shown), wherein the imaging lens assembly is disposed in the plastic barrel, and the present disclosure is not limited thereto.

Specifically, the user can activate the capturing mode by the user interface 93 of the electronic device 90. At this moment, the imaging lens module 91 collects imaging light on the image sensor 92 and outputs electronic signals associated with images to an image signal processor (ISP) 94.

Furthermore, in response to the camera specification of the electronic device 90, the electronic device 90 can further include an optical anti-shake mechanism 95, which can be an optical image stabilization (OIS) device. Moreover, the electronic device 90 can further include at least one auxiliary optical component (reference number is omitted) and at least one sensing component 96. In the 9th embodiment, the auxiliary optical component is a flash module 97 and a focus auxiliary module 98, the flash module 97 is for compensating the color temperature, and the focus auxiliary module 98 can be an infrared distance measurement component, a laser focus module, etc. The sensing component 96 can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism 95 of the imaging lens module 91 disposed on the electronic device 90 can function to obtain great image quality and facilitate the electronic device 90 according to the present disclosure to have a capturing function with multiple modes, such as taking optimized selfies, high dynamic range (HDR) with a low light source, 4K resolution recording, etc. Furthermore, the user can visually see the captured image of the camera through the touch screen and manually operate the view finding range on the touch screen to achieve the auto focus function of what you see is what you get.

Furthermore, the electronic device 90 can further include, but not be limited to, a display, a control unit, a storage unit, a random-access memory (RAM), a read-only memory (ROM), or the combination thereof.

Figure 9C:
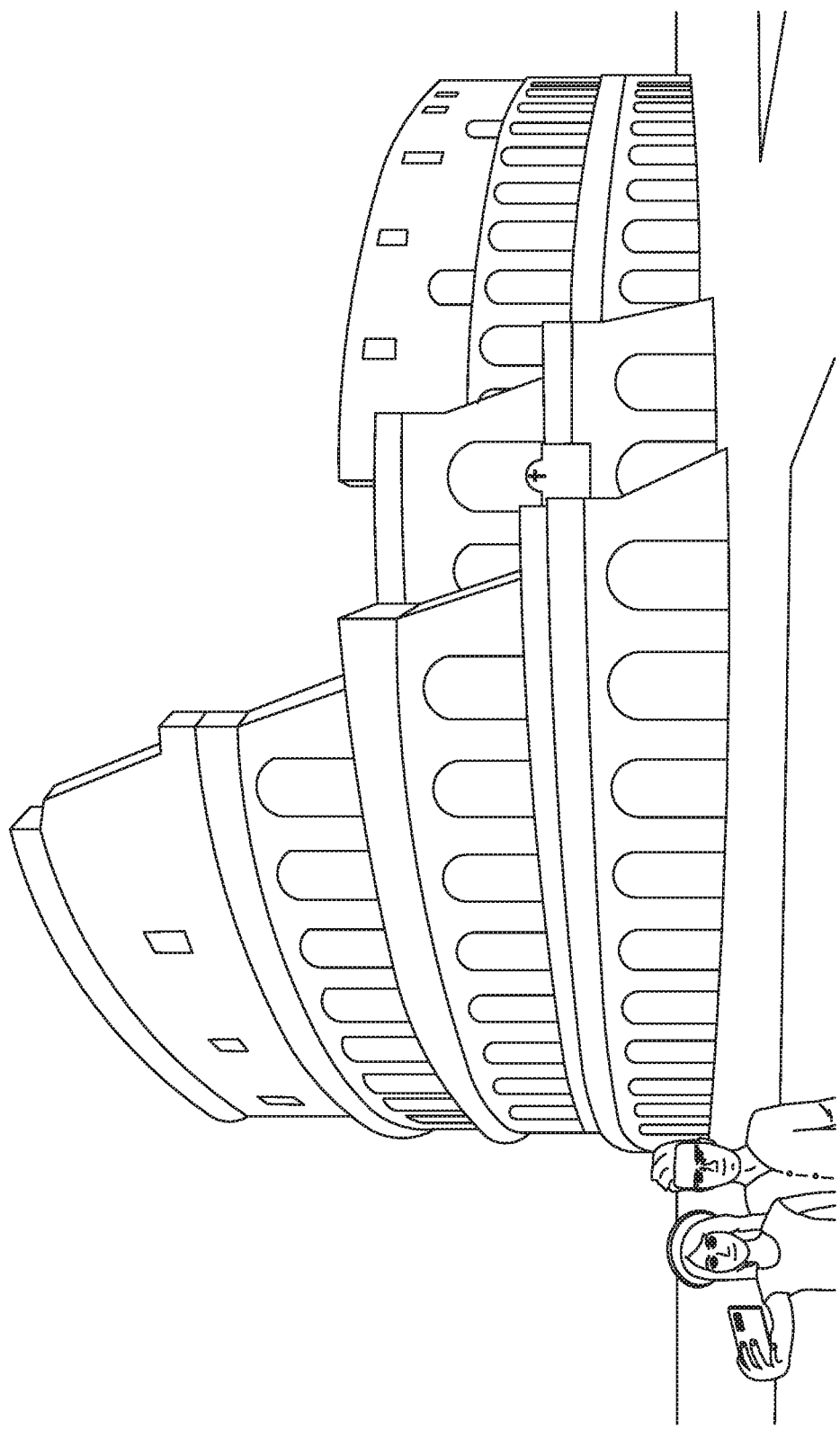
FIG. 9C is a schematic view of a selfies scene according to the 9th embodiment of FIG. 9A.
Figure 9D:
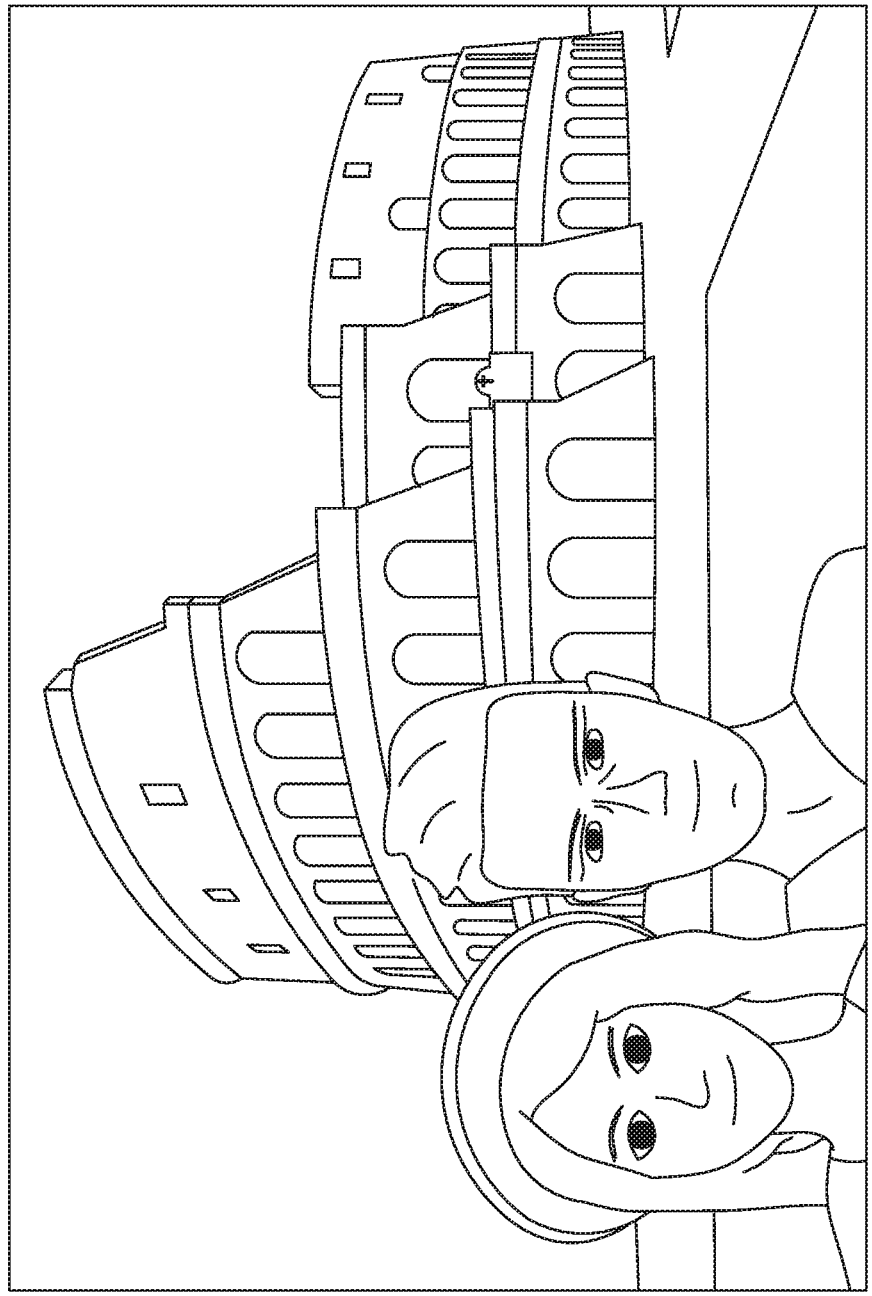
FIG. 9D is a schematic view of an image according to the 9th embodiment of FIG. 9A.

FIG. 9C is a schematic view of a selfies scene according to the 9th embodiment of FIG. 9A. FIG. 9D is a schematic view of an image according to the 9th embodiment of FIG. 9A. As shown in FIG. 9A to FIG. 9D, both of the imaging lens module 91 and the user interface 93 are faced to the user. When the selfie mode or the live streaming mode is activated, the user can simultaneously see the captured image and operate the user interface 93. After shooting, the captured image as shown in FIG. 9D can be obtained. Therefore, the imaging lens module 91 of the present disclosure can provide a better shooting experience.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. A plastic barrel, which surrounds a central axis, comprising:
an object-side portion, comprising:
an object-side opening being a smallest opening of the plastic barrel; and
a reverse inclined structure surrounding the object-side opening and comprising:
a reverse inclined surface gradually expanding from the object-side opening toward an image side; and
at least one annular concave structure disposed on an object side of the reverse inclined surface and recessed from the object-side opening along a direction away from the central axis, wherein a sectional surface of the at least one annular concave structure passing through the central axis comprises a valley point and two concave ends, and the two concave ends are disposed on an object side and an image side of the valley point, respectively; and
a tubular portion connected to the object-side portion and extending to the image side;

wherein the valley point is located on a position farthest from the central axis on the at least one annular concave structure;
wherein a central distance between the valley point and the concave end disposed on the image side thereof is a1, a central distance between the two concave ends is a2, a diameter of the object-side opening is ψ, and the following conditions are satisfied:

0.05<a1/a2<0.95; and 0.9 mm<ψ<3.2 mm.

2. The plastic barrel of claim 1, wherein the plastic barrel is made of a black plastic material and formed by an injection molding method, and the plastic barrel further comprises at least two injection traces.

3. The plastic barrel of claim 1, wherein an angle between the reverse inclined structure and the central axis is ψ, and the following condition is satisfied:

5 degrees<θ<45 degrees.

4. The plastic barrel of claim 1, wherein a number of the at least one annular concave structure is N, and the following condition is satisfied:

1≤N≤15.

5. The plastic barrel of claim 4, wherein the number of the at least one annular concave structure is N, and the following condition is satisfied:

1≤N≤10.

6. The plastic barrel of claim 1, wherein a number of the at least one annular concave structure is at least two, in the one of the at least two annular concave structures which is closest to the object-side opening, a distance between the valley point thereof and the central axis is D, a distance between the concave end disposed on the image side of the valley point thereof and the central axis is d, an elastic drafting ratio is defined as EDR, and the following condition is satisfied:

0.0%<EDR<5.0%, wherein EDR=[(D−d)/D]×100%.

7. The plastic barrel of claim 1, wherein in the two concave ends, the concave end disposed on the image side of the valley point is farther from the central axis than the concave end disposed on the object side of the valley point.

8. The plastic barrel of claim 1, wherein the central distance between the valley point and the concave end disposed on the image side thereof is a1, the central distance between the two concave ends is a2, and the following condition is satisfied:

0.10<a1/a2<0.75.

9. The plastic barrel of claim 8, wherein the central distance between the valley point and the concave end disposed on the image side thereof is a1, the central distance between the two concave ends is a2, and the following condition is satisfied:

0.10<a1/a2<0.50.

10. The plastic barrel of claim 1, wherein the diameter of the object-side opening is ψ, and the following condition is satisfied:

1.4 mm<ψ<2.8 mm.

11. An imaging lens module, comprising:
the plastic barrel of claim 1; and
an imaging lens assembly disposed in the plastic barrel.

12. An electronic device, comprising:
the imaging lens module of claim 11; and
an image sensor disposed on an image surface of the imaging lens module.

13. An imaging lens module, which has a central axis, comprising:
a plastic barrel surrounding the central axis and comprising:
an object-side portion comprising an object-side opening, a reverse inclined structure and an assembling surface, wherein the object-side opening is a smallest opening of the plastic barrel, and the reverse inclined structure surrounds the object-side opening and comprises:
a reverse inclined surface gradually expanding from the object-side opening toward an image side; and
at least one annular concave structure disposed on an object side of the reverse inclined surface and recessed from the object-side opening along a direction away from the central axis, wherein a sectional surface of the at least one annular concave structure passing through the central axis comprises a valley point and two concave ends, the two concave ends are disposed on an object side and an image side of the valley point, respectively, and the assembling surface surrounds the reverse inclined surface and is faced to the image side; and
a tubular portion connected to the object-side portion and extending to the image side and then forming a containing space;
a light blocking sheet connected to the assembling surface and having a hole, wherein the hole is corresponding to the object-side opening; and
an imaging lens assembly disposed in the containing space and having an optical axis, wherein the optical axis and the central axis are coaxial;
wherein the valley point is located on a position farthest from the central axis on the at least one annular concave structure;
wherein a central distance between the valley point and the concave end disposed on the image side thereof is a1, a central distance between the two concave ends is a2, a central distance between the light blocking sheet and the object-side opening is L, and the following conditions are satisfied:

0.05<a1/a2<0.95; and 0.2 mm<L<1.2 mm.

14. The imaging lens module of claim 13, further comprising:
a transparent plate disposed on an object side of the plastic barrel.

15. The imaging lens module of claim 14, wherein the transparent plate is a plate with a display function.

16. The imaging lens module of claim 13, wherein the reverse inclined structure is not contacted with the imaging lens assembly.

17. The imaging lens module of claim 16, wherein the light blocking sheet has an object-side surface faced to an object side and an image-side surface faced to the image side;
wherein the object-side surface is contacted with the assembling surface, and the image-side surface is contacted with the imaging lens assembly.

18. The imaging lens module of claim 13, wherein a number of the at least one annular concave structure is at least two, in the one of the at least two annular concave structures which is closest to the object-side opening, a distance between the valley point thereof and the central axis is D, a distance between the concave end disposed on the image side of the valley point thereof and the central axis is d, an elastic drafting ratio is defined as EDR, and the following condition is satisfied:

$0.0\% < EDR < 5.0\%$, wherein $EDR = [(D-d)/D] \times 100\%$.

19. The imaging lens module of claim 13, wherein in the two concave ends, the concave end disposed on the image side of the valley point is farther from the central axis than the concave end disposed on the object side of the valley point.

20. The imaging lens module of claim 13, wherein the central distance between the valley point and the concave end disposed on the image side thereof is a1, the central distance between the two concave ends is a2, and the following condition is satisfied:

$0.10 < a1/a2 < 0.75$.

21. The imaging lens module of claim 20, wherein the central distance between the valley point and the concave end disposed on the image side thereof is a1, the central distance between the two concave ends is a2, and the following condition is satisfied:

$0.10 < a1/a2 < 0.50$.

22. The imaging lens module of claim 13, wherein the imaging lens assembly comprises a plurality of lens elements, and a number of the lens elements is more than or equal to four and less than or equal to ten.

23. The imaging lens module of claim 13, wherein a focal length of the imaging lens assembly is f, a diameter of the object-side opening is ψ, and the following condition is satisfied:

$1.0 < f/\psi < 2.7$.

24. The imaging lens module of claim 23, wherein the focal length of the imaging lens assembly is f, the diameter of the object-side opening is ψ, and the following condition is satisfied:

$1.2 < f/\psi < 2.1$.

25. The imaging lens module of claim 13, wherein the object-side opening is an aperture stop of the imaging lens module.

* * * * *